United States Patent
Hotate et al.

(10) Patent No.: US 7,948,614 B2
(45) Date of Patent: May 24, 2011

(54) OPTICAL-FIBER-CHARACTERISTIC MEASURING DEVICE AND OPTICAL-FIBER-CHARACTERISTIC MEASURING METHOD

(75) Inventors: Kazuo Hotate, Tokyo (JP); Kwang Yong Song, Tokyo (JP); Zuyuan He, Tokyo (JP)

(73) Assignees: The University of Tokyo, Tokyo (JP); Yokogawa Electric Corporation, Tokyo (JP)

( * ) Notice: Subject to any disclaimer, the term of this patent is extended or adjusted under 35 U.S.C. 154(b) by 323 days.

(21) Appl. No.: 12/159,188

(22) PCT Filed: Jan. 23, 2007

(86) PCT No.: PCT/JP2007/050950
§ 371 (c)(1),
(2), (4) Date: Jun. 25, 2008

(87) PCT Pub. No.: WO2007/086357
PCT Pub. Date: Aug. 2, 2007

(65) Prior Publication Data
US 2010/0225900 A1 Sep. 9, 2010

(30) Foreign Application Priority Data
Jan. 27, 2006 (JP) .................. 2006-019705

(51) Int. Cl.
*G01N 21/00* (2006.01)
(52) U.S. Cl. ...................................... 356/73.1
(58) Field of Classification Search .................. None
See application file for complete search history.

(56) References Cited

U.S. PATENT DOCUMENTS
4,997,277 A * 3/1991 Horiguchi et al. ........... 356/73.1
6,710,863 B2 3/2004 Hotate et al.
7,170,590 B2 * 1/2007 Kishida ........................ 356/32

FOREIGN PATENT DOCUMENTS
JP 64-86032 A 3/1989
JP 3607930 B2 10/2004
JP 3667132 B2 4/2005
* cited by examiner

*Primary Examiner* — Tu T Nguyen
(74) *Attorney, Agent, or Firm* — McDermott Will & Emery LLP

(57) ABSTRACT

A measurement precision is improved and a measurement range is extended by efficiently suppressing a noise level of integrated unnecessary components from non-correlation positions. Measuring means 33 detects the Brillouin gain of a probe light output from a measurement-target optical fiber FUT while sweeping a frequency difference between the pump light and the probe light, and measures the distribution of strains of the measurement-target optical fiber FUT. An optical intensity modulator 4 performs intensity modulation on output light in synchronization with frequency modulation performed on a light source 1. Accordingly, the spectrum distribution with respect to the frequency of light from the light source 1 can be adjusted arbitrarily, and a noise spectrum shape generated at a position other than a correlation peak position and spreading over a frequency axis can be adjusted, and the peak frequency of a Lorentz spectrum generated at the correlation peak position can be measured precisely. Moreover, a measurement range $d_m$ can be extended.

12 Claims, 18 Drawing Sheets

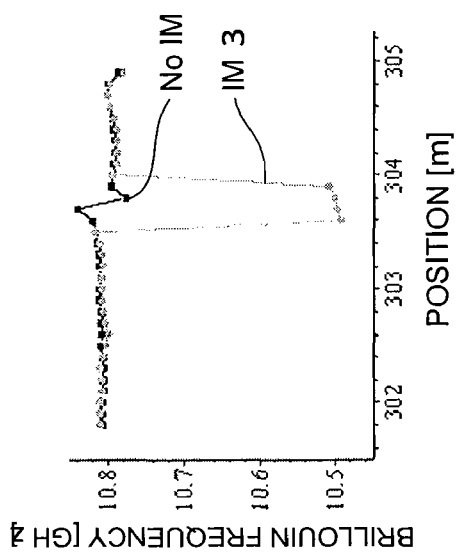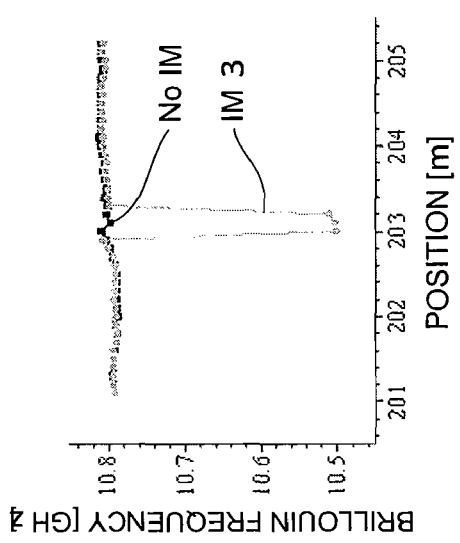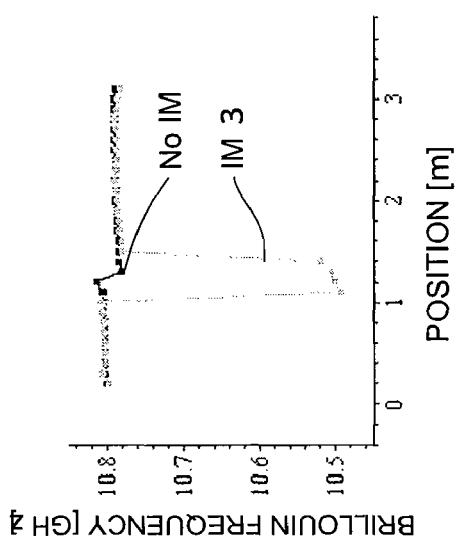

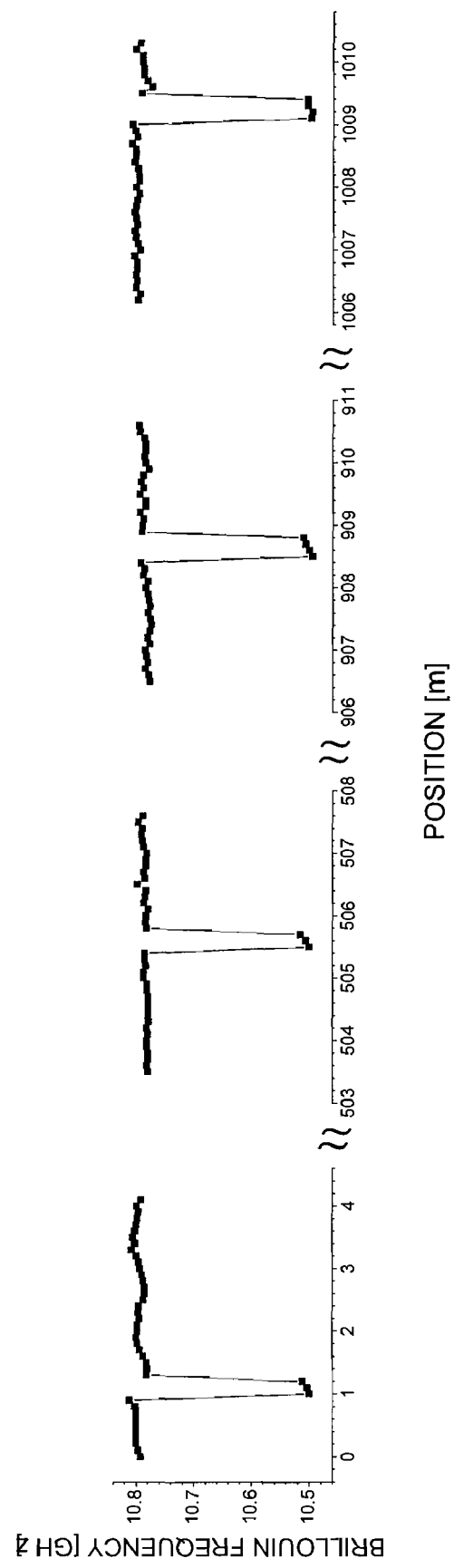

FIG.19
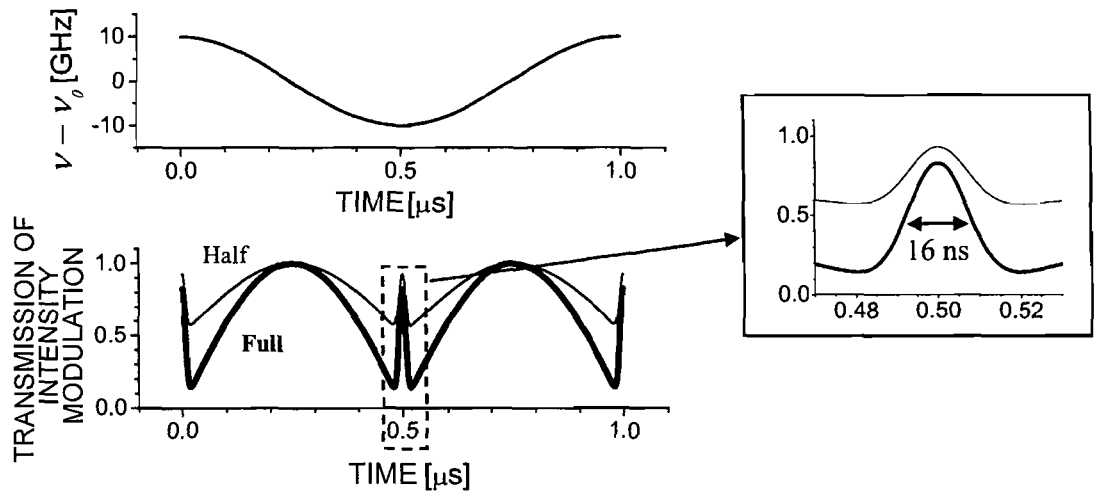
FIG.20a
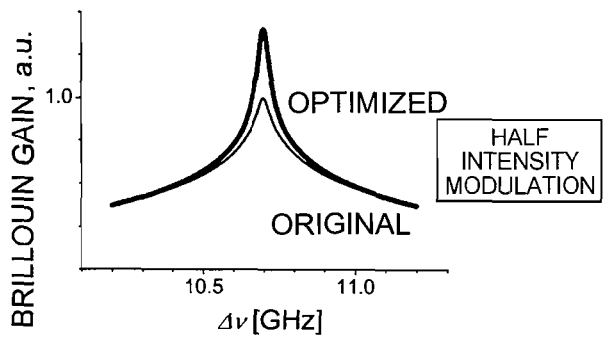
FIG.20b
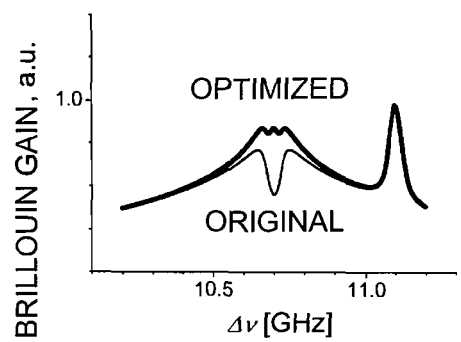
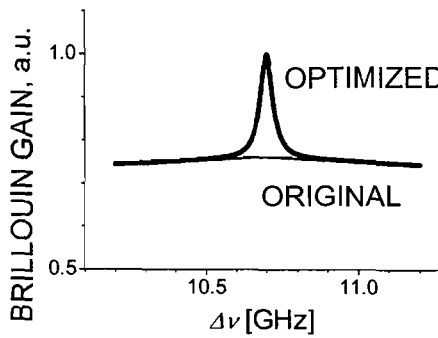
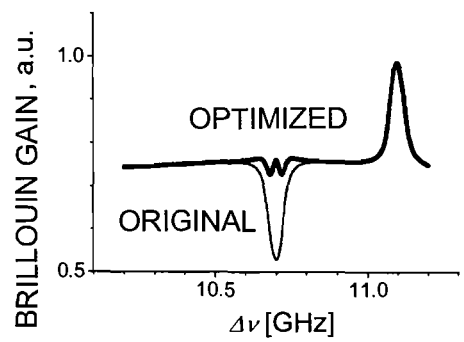

FIG.23
PRIOR ART
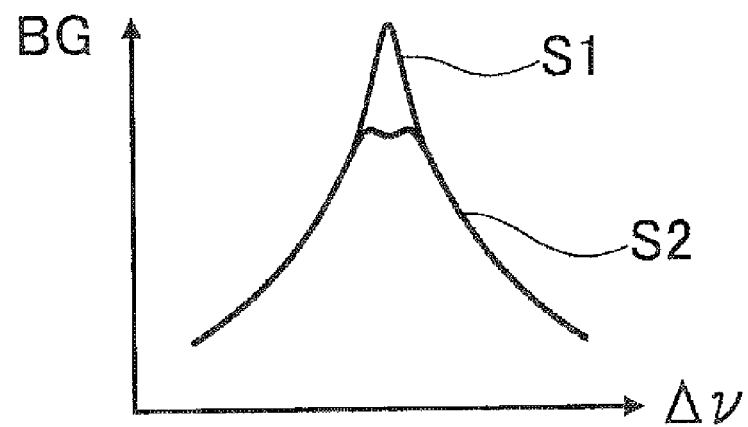
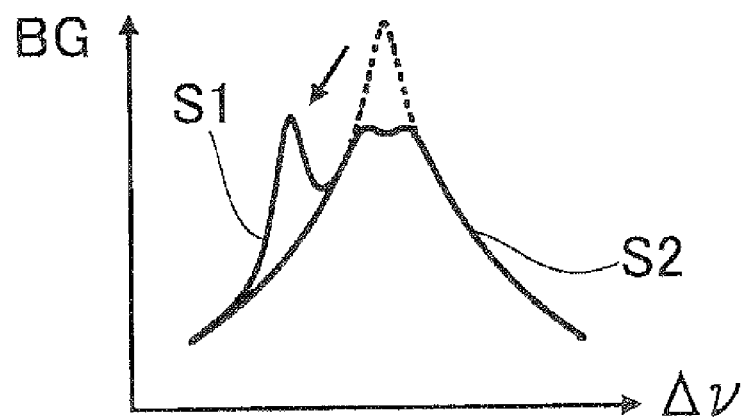

OPTICAL-FIBER-CHARACTERISTIC MEASURING DEVICE AND OPTICAL-FIBER-CHARACTERISTIC MEASURING METHOD

CROSS-REFERENCE TO RELATED APPLICATIONS

This application is a 371 National Phase of International Application No. PCT/JP2007/050950, filed Jan. 23, 2007, which claims priority to Japanese Application No. 2006-019705 filed Jan. 27, 2006. International Application No. PCT/JP2007/050950 was originally published in Japanese on Aug. 2, 2007 under Publication No. WO 2007/086357. These applications are hereby incorporated by reference in their entireties.

BACKGROUND OF THE INVENTION

1. Technical Field

The present invention relates to an optical-fiber-characteristic measuring apparatus and an optical-fiber-characteristic measuring method, and more particularly, an optical-fiber-characteristic measuring apparatus and an optical-fiber-characteristic measuring method which utilize a stimulated Brillouin scattering phenomenon that occurs in a measurement-target optical fiber to sense the distribution of strains or the like applied to the optical fiber.

2. Description of Related Art

Brillouin scattering which occurs in an optical fiber changes in accordance with a strain applied to the optical fiber. A technology which measures the distribution of strains along the lengthwise direction of an optical fiber using such a phenomenon has been developed. That technology enables the measurement of the size of a strain by measuring the frequency change in Brillouin scattering light, and enables the pinpointing of the strained portion of the optical fiber by measuring the time until the Brillouin scattering light comes back. Therefore, by causing an optical fiber to run across a construction, such as a bridge, a bridge column, a building, or a dam, and the material of a wing, fuel tank or the like of an aircraft, the distribution of strains applied to such a construction and a material can be detected. Based on the distribution of strains, the deterioration and the aged deterioration of the construction and the material can be known, resulting in disaster prevention and accident prevention.

According to a method of measuring a strain distribution amount which has been known so far, light pulses are input into an optical fiber, and a Brillouin scattering light scattered backwardly is measured in a time-resolving manner. According to such a method of measuring time regions by light pulses, however, the measurement time is long (taking several minutes to ten minutes), and the spatial resolution is limited (maximum: 1 m), so that the method is insufficient for an application where various constructions are dynamically managed. Therefore, users have been seeking a breakthrough technology which has a high spatial resolution and which can specify a portion where a strain is applied at a further short time.

To respond to such a need, the inventors of the present invention propose, unlike the conventional time-resolving measurement method of light pulses, a technology of measuring the distribution of Brillouin scatterings along the lengthwise direction of an optical fiber by controlling the interference condition of continuous light in patent literature 1 and patent literature 2, and acquire a patent for that technology. The technology is known as BOCDA (Brillouin Optical Correlation Domain Analysis), and achieves a 1 cm spatial resolution and a sampling rate of approximately 60 Hz, thereby attracting attention.

An explanation will now be given of the principle of Brillouin scattering. In a case where light is input into a general optical fiber, in ultrasound generated by thermal vibration of the glass molecules of the optical fiber material, ultrasound having a wavelength half of the wavelength of an input light is generated. Periodical changes in the refraction index of glass originating from the ultrasound work as a Bragg diffraction grating, and reflect the light backwardly. This is a Brillouin scattering phenomenon. The reflected light is subjected to a Doppler shift depending on the speed of the ultrasound, and because the size of the frequency shift changes in accordance with an expanding and contracting strain applied to the optical fiber, the strain can be detected by measuring the shift amount.

Specifically, as shown in the principle diagram of FIG. 22, two propagation waves having different frequencies, i.e., a stronger pump light and a weaker probe light, are oppositely propagated into a measurement-target optical fiber FUT from a light source 101 including a semiconductor laser, a signal generator, or the like. At this time, as a particular phase (frequency) matching condition is satisfied between the pump light and the probe light ($f_{pump}=f_{probe}+V_B$, where $f_{pump}$ is the center frequency of the pump light, $f_{probe}$ is the center frequency of the probe light, and $V_B$ is a Brillouin frequency), acoustic phonons which scatter photons from the pump light to the probe light are generated by the interaction between both waves. This causes the amplification of the probe light as stimulated Brillouin scattering. However, when the frequency difference between the pump light and the probe light varies largely, stimulation is suppressed.

As explained in, for example, patent literature 1, the basic principle of the BOCDA method is to periodically generate Brillouin scattering having an intensive and sharp correlation peak and depending on a position along the measurement-target optical fiber FUT by performing the same frequency modulation on the pump light and the probe light propagated oppositely. Thus, according to the BOCDA method, light output from the light source 101 serves as continuous oscillation light, the oscillation frequencies thereof are changed by the repeated waveform of a sine wave, and a non-illustrated optical frequency modulator changes the center frequency $f_{probe}$ of the probe light in such a way that the difference between the center frequency $f_{probe}$ of the probe light and the center frequency $f_{pump}$ of the pump light becomes close to the Brillouin frequency $V_B$. Accordingly, at most positions where the phases of the pump light and the probe light become asynchronous and the correlation of both lights is low, scattered light is widespread and weakened across a frequency range, and on the other hand, at a specific narrow position (correlation position) of the order of a cm where the phases of the pump light and the probe light are synchronous and the correlation of both lights is high, stimulated Brillouin scattering having an original peak spectrum occurs. Shifting the correlation position enables a measurement of the distribution of strain by Brillouin scattering.

FIG. 22 shows the spectrum shape of stimulated Brillouin scattering occurred at each position in the measurement-target optical fiber FUT. Note that BG means a Brillouin gain, and $\Delta V$ means a frequency difference between the pump light and the probe light. Due to frequency-modulated light from the light source 101, a stimulated scattered spectrum is widespread over a frequency axis and is weakened at most positions of the measurement-target optical fiber FUT, but a relative frequency difference between the pump light and the probe light becomes constant at a specific position (correlation position), and stimulated Brillouin scattering having an original Lorentz spectrum occurs.

As explained above, in a case where sinusoidal frequency modulation is performed on the light source 101, a spatial resolution $\Delta z$ and a measurement range (interval between adjoining correlation positions) $d_m$ of the BOCDA method can be given by the following equations 1 and 2, respectively.

$$\Delta z = (V_g \cdot \Delta V_B)/2\pi f_m \cdot \Delta f \quad \text{[Equation 1]}$$

$$d_m = V_g/2f_m \quad \text{[Equation 2]}$$

Note that $V_g$ is the speed of light in the measurement-target optical fiber FUT, $\Delta V_B$ is the Brillouin gain line width of the measurement-target optical fiber FUT (up to 30 MHz for general fibers), $f_m$ is a frequency-modulation frequency of the light source 101, and $\Delta f$ is amplitude of frequency modulation. As explained in patent literature 1, to cause only a single position where a correlation peak occurs (correlation position) to be present within a measurement range, equation 2 is used and the measurement range $d_m$ is adjusted. In this case, because the measurement range $d_m$ is inversely proportional to the frequency-modulation frequency $f_m$, if the frequency-modulation frequency which is the speed of frequency modulation on the light source 101 is lowered to make the frequency-change gradual, the interval between adjoining 0-order to n-order correlation positions, and the measurement range $d_m$ can be extended. However, the 0-order correlation position where the optical path difference between the probe light and the pump light does not change by merely changing the frequency-modulation frequency $f_m$. Accordingly, to change all of the 0-order to n-order correlation positions while maintaining the measurement range $d_m$, an optical delay device may be inserted into the optical path of either of the probe light or the pump light. By changing the frequency-modulation frequency $f_m$ of the light source 101 in this manner, a correlation position where a Brillouin gain spectrum is measured can be changed.

In a case where the frequency-modulation frequency $f_m$ is lowered to extend the measurement range $d_m$, in this case, as is apparent from equation 1, the spatial resolution $\Delta z$ is deteriorated and becomes a large value. Therefore, to extend the measurement range $d_m$ while maintaining the spatial resolution $\Delta z$ high, the amplitude (modulation amplitude) $\Delta f$ of the light source 101 may be increased within a range where the spectra of the probe light and the pump light do not overlap with each other.

According to the BOCDA method, measuring means for detecting the Brillouin gain BG of the probe light at an end of the measurement-target optical fiber FUT and recording it while sweeping around the frequency difference between the pump light and the probe light and roughly corresponding to the Brillouin frequency $V_B$ is used. The spectrum shape (output of this measurement method) of a Brillouin gain obtained from an end of the measurement-target optical fiber FUT is a sum of Lorentz spectra (actual signal) generated at a correlation position and the integrated value (noise) of a wide spectrum generated at another position. This will be explained with reference to FIG. 23, and in FIG. 23, the spectrum shapes of individual detection outputs are shown for a case where no strain is applied to the correlation position (upper part) and for a case where a strain is applied to the correlation position (bottom part). A spectrum shape be can be divided into the component of an actual signal S1 from a correlation peak, and the component of a noise S2 from each of all positions other than the correlation position. In a case where a strain, a temperature change, or the like is applied to the position of the correlation peak, as shown in the bottom part of FIG. 23, only the actual signal S1 shifts from the original frequency difference $\Delta V$. That is, the peak of the Brillouin gain spectrum generated at the correlation position represents a strain at the correlation position as the actual signal S1. Accordingly, when the correlation position is swept while changing the frequency ($f_m$) of the frequency modulation of the light source 101, and when the peak frequency of a spectrum at each correlation position is specified, it becomes possible to measure the distribution of strains along the measurement-target optical fiber FUT.

Patent Literature 1: Japanese Patent Publication No. 3667132

Patent Literature 2: Japanese Patent Publication No. 3607930

According to the foregoing device and method which measure the distribution of characteristics like strains of the measurement-target optical fiber FUT, the longer the measurement-target optical fiber FUT becomes, the wider the measurement range $d_m$ must be extended, resulting in an integration of unnecessary components weakened at respective positions other than the correlation position, thus increasing the noise S2. That is, because the level of the noise S2 detected by the measuring means is a sum of all Brillouin gain spectra from all non-correlation positions, the wider the measurement range $d_m$ becomes under a certain spatial resolution $\Delta z$, the more the peak-to-peak ratio (SNR) between the actual signal and the noise decreases. Accordingly, as particularly shown in the bottom part of FIG. 23, at a position where the shift frequency of the accrual signal S1 due to a strain is large, the signal peak thereof becomes smaller than the level of the noise S2, so that the measurement of the distribution of strains becomes difficult.

As explained above, the background component of the noise S2 deteriorates the precision of measuring the distribution of characteristics of the measurement-target optical fiber FUT, and limits the measurement range $d_m$, so that there is a demand to suppress the noise S2 which is an unnecessary component.

The present invention has been made in view of the foregoing problems, and it is an object of the invention to provide new optical-fiber-characteristic measuring apparatus and optical-fiber-characteristic measuring method which effectively suppress the noise level of integrated unnecessary components from non-correlation positions to improve the measurement precision, and to extend a measurement range.

SUMMARY OF THE INVENTION

To achieve the object, an optical-fiber-characteristic measuring apparatus of the invention comprises: a light source unit which outputs light having undergone frequency modulation; probe light generating means for performing frequency shift on the output light from the light source unit and inputting that light as probe light into one end of a measurement-target optical fiber; pump light generating means for inputting the output light from the light source unit as pump light into the other end of the measurement-target optical fiber; measuring means for detecting a Brillouin gain of the probe light output from the measurement-target optical fiber while sweeping a frequency difference between the pump light and the probe light, thereby measuring a characteristic of the measurement-target optical fiber, and wherein the optical-fiber-characteristic measuring apparatus further comprises intensity modulating means for modulating an intensity of the output light in synchronization with the frequency modulation of the light source unit.

In this case, it is preferable that the intensity modulating means should set the intensity of the output light to be close to the maximum value as a frequency of the output light becomes close to the center of variation, and set the intensity of the output light to be close to the minimum value as the frequency of the output light becomes close to the upper limit and the lower limit, and it is further preferable that the intensity modulating means should set the intensity of the output light to be a larger value than the minimum value at a timing when the frequency of the output light reaches the upper limit and the lower limit.

According to the foregoing structure, it is preferable that the intensity modulating means should comprise an optical intensity modulator. Alternatively, it is preferable that the intensity modulating means should comprise an optical filter. Further alternatively, it is preferable that the intensity modulating means should comprise a signal generator which performs frequency modulation on the output light from the light source unit with a repeated waveform other than a sinusoidal wave.

An optical-fiber-characteristic measuring method of the invention comprises: performing frequency shift on a light having undergone frequency modulation from a light source unit, and inputting that light as probe light into one end of a measurement-target optical fiber; inputting light having undergone frequency modulation by the light source unit as pump light into the other end of the measurement-target optical fiber; detecting a Brillouin gain of the probe light output from the measurement-target optical fiber while sweeping a frequency difference between the pump light and the probe light, thereby measuring a characteristic of the measurement-target optical fiber; and wherein the optical-fiber-characteristic measuring method further comprising performing intensity modulation on the output light in synchronization with the frequency modulation of the light source unit.

In this case, it is preferable that the intensity modulation performed on the output light should be to set the intensity of the output light to be close to the maximum value as a frequency of the output light becomes close to the center of variation, and to set the intensity of the output light to be close to the minimum value as the frequency of the output light becomes close to the upper limit and the lower limit, and it is further preferable that the intensity modulation performed on the output light should be to set the intensity of the output light to be a larger value than the minimum value at a timing when the frequency of the output light reaches the upper limit and the lower limit.

In the foregoing method, it is preferable that an optical intensity modulator should perform the intensity modulation on the output light. Alternatively, it is preferable that an optical filter should perform the intensity modulation on the output light. Further alternatively, it is preferable that a signal generator which performs frequency modulation on the output light from the light source unit with a repeated waveform other than a sinusoidal wave should perform the intensity modulation on the output light.

According to the optical-fiber-characteristic measuring apparatus of the first aspect of the invention, and the optical-fiber-characteristic measuring method of the seventh aspect of the invention, the intensity modulating means perform intensity modulation in synchronization with frequency modulation performed on light from the light source unit, so that the intensity of the output light can be increased or reduced at a specific frequency, thereby appropriately adjusting the spectrum distribution of the output light. Therefore, a noise spectrum shape generated at a position other than a correlation peak position and spreading over the frequency axis can be adjusted, and the peak frequency of the Lorentz spectrum generated at the correlation peak position can be precisely measured, and the measurement range can be extended.

According to the optical-fiber-characteristic measuring apparatus of the second aspect of the invention, and the optical-fiber-characteristic measuring method of the eighth aspect of the invention, it is possible to improve the intensive deflection of the intensity of the output light in the vicinity of the upper end and the lower end of the frequency of the output light in association with the variation of the frequency of the output light from the light source. Therefore, the peak of the Lorentz spectrum can be maintained larger than the peak of the background spectrum, and even if a large strain is applied, the value there can be correctly measured.

According to the optical-fiber-characteristic measuring apparatus of the third aspect of the invention, and the optical-fiber-characteristic measuring method of the ninth aspect of the invention, even in a case where no strain of the measurement-target optical fiber is present or a strain is little, the peak of the Lorentz spectrum can be made larger than the peak of the background spectrum, and regardless of the strain amount of the measurement-target optical fiber, a strain can be measured precisely.

According to the optical-fiber-characteristic measuring apparatus of the fourth aspect of the invention and the optical-fiber-characteristic measuring method of the tenth aspect of the invention, it is possible to perform appropriate intensity modulation on the output light from the light source upon reception of the synchronization signal from the light source unit.

According to the optical-fiber-characteristic measuring apparatus of the fifth aspect of the invention and the optical-fiber-characteristic measuring method of the eleventh aspect of the invention, the intensity of the output light can be adjusted in accordance with the frequency thereof by the inherent filtering characteristic of the optical filter, and the noise reduction and the extension of the measurement range can be easily realized without a synchronization signal from the light source unit.

According to the optical-fiber-characteristic measuring apparatus of the sixth aspect of the invention and the optical-fiber-characteristic measuring method of the twelfth aspect of the invention, by merely changing the frequency modulation waveform of the output light to a waveform other than a sinusoidal wave using the signal generator, the spectrum distribution of the output light can be appropriately adjusted like the case where intensity modulation is performed on the output light, thereby realizing noise reduction and extension of the measurement range.

BRIEF DESCRIPTION OF DRAWING

FIGS. 9a-9c are graphs showing Brillouin frequencies measured at respective DSF parts for three separate positions for a case where no intensity modulation is performed (No IM) and for a case where most appropriate intensity modulation is performed (IM3) in the experimental example of the apparatus shown in FIG. 1;

FIGS. 13a-13d are graphs showing Brillouin frequencies measured at respective DSF parts when most appropriate intensity modulation is performed (with IM) at specific positions in another experimental example of the apparatus shown in FIG. 1;

FIG. 19 shows a simulation result of the BOCDA system in a case where intensity modulation is performed in synchronization with frequency modulation in such a way that an intensity is left at both sides of the time-average spectrum to some level, and is a graph showing the frequency modulation waveform and intensity modulation waveform of the output light from the light source;

FIGS. 20a-20b are graphs showing output spectrum shapes for original intensity modulation shown in FIG. 18 and optimized intensity modulation, respectively;

FIG. 23 is a graph showing Brillouin spectrum shapes in principle when no strain is applied to a correlation position and when a strain is applied to the correlation position.

DETAILED DESCRIPTION OF THE INVENTION

Explanations will be given of the embodiments of preferable optical-fiber-characteristic measuring apparatuses and optical-fiber-characteristic measuring methods of the present invention in detail with reference to the accompanying drawings.

Figure 1:
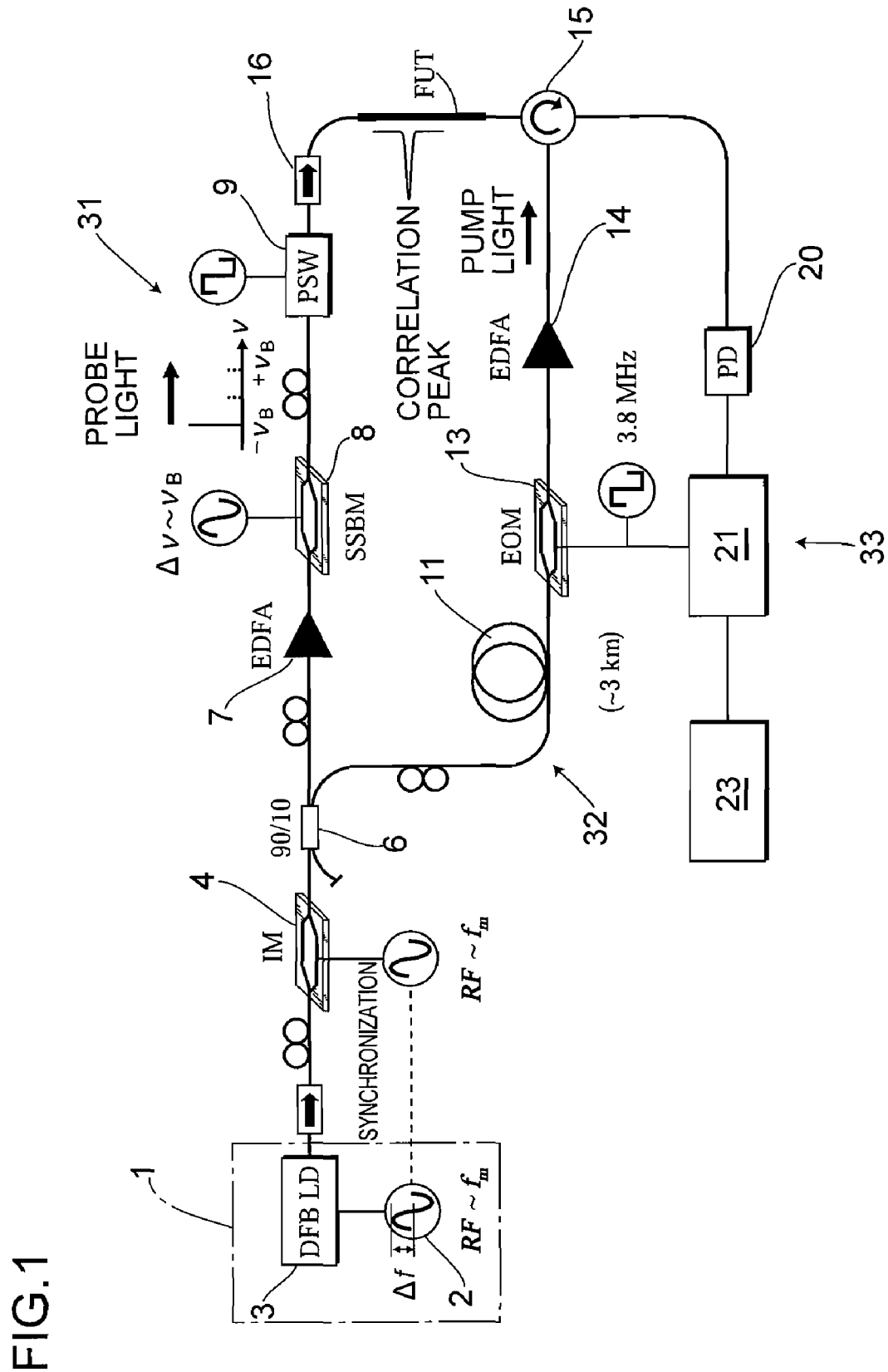
FIG. 1 is a block diagram showing the structure of an optical-fiber-characteristic measuring apparatus according to the first embodiment of the invention.

FIG. 1 shows an optical-fiber-characteristic measuring apparatus according to the first embodiment. In the figure, reference numeral 1 denotes a light source which comprises a signal generator 2 and a semiconductor laser 3. A possible semiconductor laser 3 is, for example, a distributed feedback laser diode (DFB LD) which is small in size and emits a laser light having a narrow spectrum width. The signal generator 2 is for outputting a desired modulated signal as an injected current to the semiconductor laser 3 to perform sinusoidal frequency modulation (including phase modulation) on continuous laser light emitted from the semiconductor laser 3.

Reference numeral 4 denotes an optical intensity modulator (IM) as intensity modulating means for performing intensity modulation on output light from the semiconductor laser 3 in synchronization with the frequency modulation performed on the semiconductor laser 3. The optical intensity modulator 4 has a function of receiving a synchronization signal corresponding to an input signal from the signal generator 2, and of modulating the intensity of output light from the semiconductor laser 3, and comprises, specifically, an electro-optical modulator (EOM). In the embodiment, addition of such an optical intensity modulator 4 to an optical-fiber-characteristic measuring apparatus of the conventional BOCDA method is remarkable, and another structure of the intensity modulating means will be discussed later.

Reference numeral 6 denotes a first optical branch device which divides the laser light whose frequency and intensity are modulated by the optical intensity modulator 4 into two at an intensity ratio of, for example, 90/10, the one divided laser light is amplified by an erbium-doped optical fiber amplifier (hereinafter, EDFA) 7. Further, the intensity-modulated light amplified by the EDFA 7 is subjected to frequency reduction of approximately 10 GHz by a single sideband modulator (SSBM: hereinafter called SSB modulator) 8, and is input as a probe light into one end of the measurement-target optical fiber FUT.

The SSB modulator 8 uses a microwave and accurate DC bias control to suppress higher frequency components in two first-order sidebands and maintain a stable frequency difference $\Delta V$ from a pump light, and outputs a low frequency sideband, which has a frequency difference $\Delta V$ equal to a microwave frequency with respect to an input light, as a probe light. A polarization switch (PSW) 9 for a polarization diversity scheme is inserted subsequent to the SSB modulator 8. The polarization switch 9 is provided to suppress a polarization-dependent fluctuation of a Brillouin gain.

On the other hand, the other laser light divided by the first optical branch device 6 passes through an optical delay device 11 comprising an optical fiber having a predetermined length, is subjected to intensity modulation by an optical intensity modulator 13 having a reference signal generator 12, and is amplified by an EDFA 14. The intensity-modulated light amplified by the EDFA 14 passes through a second optical branch 15, and is input as a pump light into the other end of the measurement-target optical fiber FUT, so that the probe light and the pump light are propagated oppositely in the measurement-target optical fiber FUT. Note that the optical delay device 11 is for setting a predetermined delay time between the pump light and the probe light as explained above, and the delay time can be appropriately adjusted by changing the optical fiber length.

The outgoing light from the other end of the measurement-target optical fiber FUT is captured into a light detector 20 through the second optical branch 15, and power thereof is measured. Detection outputs from the light detector 20 are subjected to synchronized detection at the modulation frequency of the pump light by passing through a lock-in amplifier 21, and the Brillouin gain of the probe light originating from a stimulated Brillouin phenomenon is captured as final data at a predetermined sampling rate by a data processing device 23 as measuring means comprising, for example, a personal computer.

The optical intensity modulator 13 provided in the optical path of the pump light comprises, for example, an electro-optical modulator like the optical intensity modulator 4. The first optical branch device 6 and the second optical branch device 15 may be circulators, beam splitters, half mirrors, and the like. In a modified embodiment, light source devices 1 may be separately provided for the probe light and the pump light, respectively, and in this case, intensity modulating means for synchronizing with a frequency modulation of each light source 1 may be provided for each light source 1.

In the embodiment, the EDFA 7, the SSB modulator 8, and the polarization switch 9 constitute probe light generation means 31 for generating a probe light from the output light of the light source 1, the optical delay device 11, the optical intensity modulator 13, EDFA 14, and the second optical branch device 15 constitute pump light generating means 32 for generating a pump light from the output light of the light source 1, and the light detector 20, the lock-in amplifier 21, and the data processing device 23 constitute measuring means 33 for detecting the Brillouin gain of the probe light output from the end of the measurement-target optical fiber FUT while sweeping the frequency difference between the pump light and the probe light, and for measuring a strain which is a characteristic of the measurement-target optical fiber FUT.

As explained above, the apparatus shown in FIG. 1 obeys the basic principle of the BOCDA method, light from the light source 1 serves as continuous oscillation light, and the SSB modulator 8 changes the center frequency $f_{probe}$ of the probe light in such a way that the difference between the center frequency $f_{probe}$ of the probe light and the center frequency $f_{pump}$ of the pump light becomes close to the Brillouin frequency $V_B$, while changing the oscillatory frequency of the continuous oscillation light by a sinusoidal repeating waveform through the signal generator 2. Accordingly, at most positions where the phases of the pump light and the probe light are asynchronous and a correlation of both lights is low, stimulation is suppressed, but at a correlation position where the phases of the pump light and the probe light are synchronized, stimulated Brillouin scattering occurs. Shifting the correlation position makes it possible to measure the distribution of strains due to Brillouin scattering.

Correlation positions due to stimulated Brillouin scattering periodically appear along the measurement-target optical fiber FUT sandwiched between the isolator 16 and the circulator (second optical branch device) 15 because modulations of the probe light and the pump light are periodical. Accordingly, the delay amount of the optical delay device 11 and the frequency-modulation frequency $f_m$ applied to the semiconductor laser 3 are adjusted in such a way that only one correlation peak is present at one location in the measurement-target optical fiber FUT. Further, it is necessary to increase the amplitude Δf of the frequency modulation to the semiconductor laser 3 within a range where the spectrum of the probe light and that of the pump light do not overlap in order to extend the measurement range of the apparatus while maintaining the spatial resolution Δz thereof high.

Next, an explanation will be given of the operation of the apparatus shown in FIG. 1. A frequency-modulated laser light is output from the semiconductor laser 3 by an injected current from the signal generator 2, and the output light passing through the optical intensity modulator 4 is subjected to intensity modulation in synchronization with the frequency modulation by a synchronization signal output from the signal generator 2 to the optical intensity modulator 6. The laser light whose frequency and intensity are both modulated is divided by the first optical branch device 4 at a predetermined intensity ratio, and the one light is amplified by the EDFA 7 and input into the SSB modulator 8. The SSB modulator 8 performs SSB modulation on the modulated light, generates a sideband having a frequency difference (approximately 10 GHz) which is close to the Brillouin frequency $V_B$ with respect to the center frequency of the modulated light. The sideband passes through the polarization switch 9 and the isolator 16, and is input as a probe light into one end of the measurement-target optical fiber FUT.

The other modulated light divided by the first optical branch device 6 passes through the optical delay device 11, is added to a predetermined delay time, and is input into the optical intensity modulator 13, and is subjected to intensity modulation based on the frequency of a reference signal generated from the reference signal generator 12. The modulated laser light chopped by the intensity modulation is amplified by the subsequent EDFA 14, and is input as a pump light into the other end of the measurement-target optical fiber FUT through the second optical branch device 15.

In this way, as the probe light and the pump light are propagated oppositely in the measurement-target optical fiber FUT, some of the pump light having undergone reflection and backward scattering is output from the measurement-target optical fiber FUT, and the increment of the probe light by stimulated Brillouin scattering is superimposed on the continuous probe light, and is output from the measurement-target optical fiber FUT. Those output lights are detected by the light detector 20, and are subjected to synchronous detection by the lock-in amplifier 21 at the intensity modulated frequency of the pump light, and then only the increment of the probe light generated in synchronization with the chopping of the pump light is acquired and amplified, and other frequency components are removed. It is not illustrated in FIG. 1, but some of the pump light having undergone reflection and backward scattering is output from the measurement-target optical fiber FUT, and to eliminate such components of the pump light, an optical filter may be provided in front of the light detector 20. The data processing device 23 receives an output signal from the lock-in amplifier 21, determines at which frequency the peak of the stimulated-Brillouin-scattering spectrum at a correlation peak is present, thereby measuring the distribution of strains in the measurement-target optical fiber FUT.

In a case of a conventional apparatus which has no optical intensity modulator 4, if the measurement range $d_m$ is extended under a certain spatial resolution Δz, a peak-to-peak ratio (SNR) between the actual signal S1 at a correlation peak shown in FIG. 23 and the noise S2 which is an accumulation of weakened unnecessary components at non-correlation positions becomes small, and it becomes difficult to accurately measure the peak frequency of the actual signal S1. This is because the spectrum distribution of the output light from the light source 1 cannot be adjusted arbitrarily.

On the other hand, according to the embodiment, the output light from the light source 1 is subjected to not only frequency modulation but also intensity modulation in synchronization with the frequency modulation by the optical intensity modulator 4, so that the intensity of the output light can be reduced or increased at a specific frequency for example, and the spectrum distribution of the output light can be adjusted appropriately in such a manner as not to be emphasized for only a specific frequency. Accordingly, the SNR between the actual signal S1 at a correlation peak and the noise S2 is improved, and the noise S2 is reduced, resulting in an accurate measurement of the peak frequency of the actual signal S1 and in an extension of the measurement range $d_m$.

Next, an explanation will be given of an experimental example of the apparatus shown in FIG. 1 and the result thereof. In the experimental example, a distributed feedback laser diode (DFB LD) of 1552 nm was used for the semiconductor laser 3 of the light source 1, and signal generator 2 performed sinusoidal frequency modulation to cause a correlation peak in a sample measurement-target optical fiber FUT. The output from the semiconductor laser 3 was directly used as a Brillouin pump light, and was amplified by the EDFA 14 after passing through a 3-km delay fiber, serving as the optical delay device 11, to control the correlation peak order. On the other hand, a probe light was generated through the SSB modulator 8 using a microwave and accurate DC bias control to suppress a higher frequency component in two first-order sidebands, and to acquire a stable frequency difference ΔV with respect to the pump light. A suppression ratio of greater than or equal to 25 dB with other frequency components at the SSB modulator 8 was maintained. The pump light was subjected to intensity modulation for lock-in detection, and the chopping frequency thereof was 3.8 MHz. A photodiode having a band of 125 MHz was used as the light detector 20, and final data was acquired after the lock-in amplifier 21.

The frequency-modulation frequency $f_m$ of the semiconductor laser 3 was set to 310 to 330 kHz depending on the correlation peak position of the measurement-target optical fiber FUT, and corresponds to an interval of correlation peaks, i.e., the measurement range $d_m$ of greater than or equal to 310 m according to equation 2. The amplitude Δf of the frequency modulation was 9.5 GHz, and it is calculated that the spatial resolution Δz of the measurement is about 30 cm from equation 1.

Figure 5:
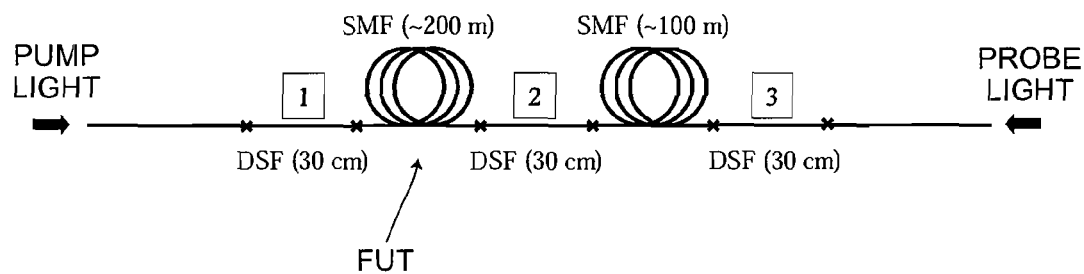
FIG. 5 is an explanatory diagram showing the structure of a measurement-target optical fiber FUT used as a test sample of the apparatus shown in FIG. 1.

As shown in FIG. 5, the measurement-target optical fiber FUT included a continuous general fiber (SMF: single mode optical fiber) and three dispersion shifted optical fibers (DSF) each having a length of 30 cm, and all of those fibers were connected together by fusion bonding, and the total length was about 305 m. The average Brillouin shift amount of the measurement-target optical fiber FUT, i.e., the Brillouin frequency $V_B$, was 10.5 GHz in the DSF part, and was 10.8 GHz in the SMF part. The difference of the Brillouin frequency $V_B$ between the two kinds of fiber parts corresponds to a stimulated strain of up to 6000με which can cover most situations of distribution sensing.

Figure 6A:
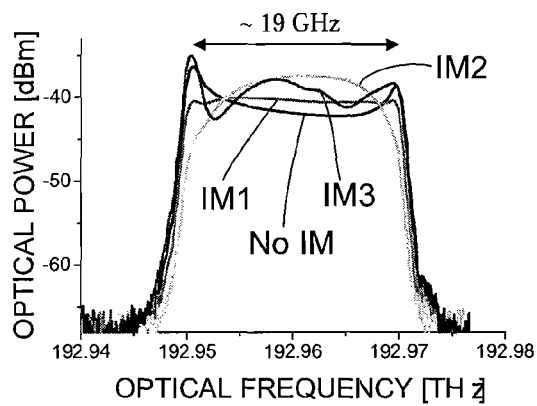
FIG. 6a is a graph of a measurement result showing power spectra of respective modulated lights.

In the experimental example, modulated lights of different power spectra shown in FIG. 6(a) were generated for a case where no conventional intensity modulation was performed but only sinusoidal frequency modulation was performed, and for a case where three different intensity modulations were performed using the optical intensity modulator 4, respectively. In the figure, "No IM" represents modulated light having undergone conventional sinusoidal frequency modulation, and "IM1", "IM2", and "IM3" represent modulated lights having undergone intensity modulations by the optical intensity modulator 4, and for respective modulated lights, time-averaged power spectra measured by an optical spectrum analyzer are shown.

Figure 6B:
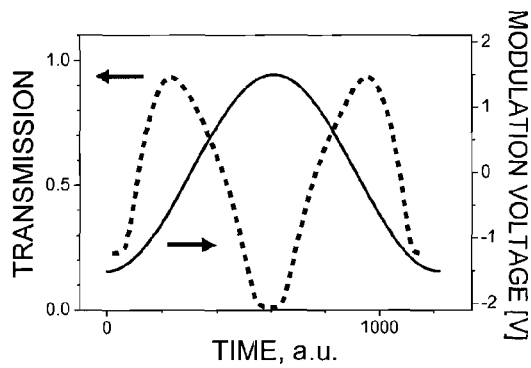
FIG. 6b is a graph showing a modulation voltage representing a conventional frequency modulation waveform and a transmission factor of an optical intensity modulator corresponding to the power spectrum of a modulated light (IM1) in the experimental example of the apparatus shown in FIG. 1.

The power spectrum of the conventional modulated light (No IM) was first compensated to generate the power spectrum of the modulated light (IM1) whose optical power had a flat upper part across most frequency regions. The power spectra of the other modulated lights (IM2, IM3) were generated by adjusting an offset and an amplitude applied to the optical intensity modulator 4 when acquiring the power spectrum of the modulated light (IM1). That is, the conventional modulated light (No IM) acquired from the light source 1 had a frequency swung sinusoidally, remained at the maximum displacement part of the frequency for a relatively long time, and the power spectrum thereof had intensities increasing at the upper limit of the frequency and both ends in the vicinity of the minimum limit. On the other hand, regarding the modulated light (IM1), since optical intensity modulation was performed in a synchronizing manner, the intensity of the light was adjusted in such a manner as to be almost flat across all frequency width. Regarding another modulated light (IM2), it was adjusted in such a way that the intensity of the light become maximum at an approximate center of the frequency width (i.e., in such a way that a concaved intensity characteristic with respect to the frequency was acquired). Further, regarding the other modulated light (IM3), it was adjusted in such a way that there remain portions where intensities thereof increased at both ends of the frequency width, and the intensity also increased at an approximate center of the frequency width. Note that FIG. 6(b) shows a modulated voltage representing a conventional frequency modulation waveform (actual line) and the permeability (dashed line) of the optical intensity modulator 4 applied to generate the power spectrum of the modulated light (IM1) having a flat upper part.

The Brillouin gain spectra measured using the respective modulated lights (No IM, IM1, IM2, and IM3) were measured at respective locations of the measurement-target optical fiber FUT, and the part "2" of the DSF shown in FIG. 5 was selected as a measuring point. The frequency difference ΔV of the SSB modulator was swept from 10.2 GHz to 11.2 GHz, and the entire speed of the measurement for one point was set to 10 Hz.

Figure 7:
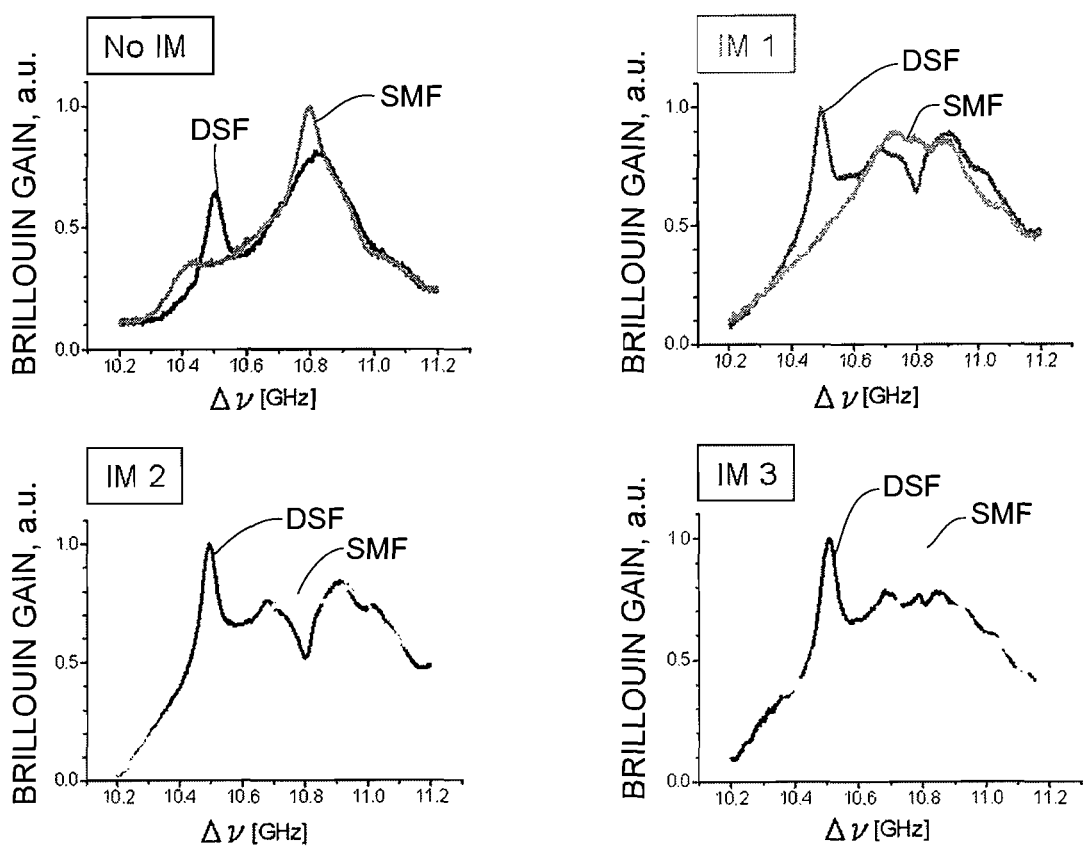
FIG. 7 is a graph showing Brillouin gain spectra measured at a DSF part and an SMF part using the modulated lights (No IM, IM1, IM2, and IM3) in the experimental example of the apparatus shown in FIG. 1.

The modulated lights (No IM, IM1, IM2, and IM3) generated in this way were used, and FIG. 7 shows Brillouin gain spectra measured at the DSF part and the SMF part by the measuring means 33. In the figure, the upper left part shows the Brillouin gain spectra at the DSF part and the SMF part, respectively, by the conventional modulated light (No IM) not subjected to intensity modulation, and the component of the actual signal became smaller than the noise level at, in particular, the DSF part, so that the condition of the actual signal could not be detected accurately, and it was difficult to measure the amount of strain through a final peak frequency determination. On the other hand, the upper right, lower left, and lower right graphs show the Brillouin gain spectra at the DSF part and the SMF part by the respective modulated lights (IM1, IM2, and IM3) having undergone intensity modulations, and it was observed that the noise peak greatly decreased at the DSF part with respect to the amplitude of the actual signal for all cases where intensity modulations were performed. Accordingly, the peak frequency could be determined accurately at the DSF part for all cases of the modulated lights (IM1, IM2, and IM3). In the case of the modulated lights (IM1, IM2), a large depression was observed at the center of the background noise level, this resulted in an "absorption" effect of the actual signal, shown in the Brillouin gain spectrum BGS at the SMF part, and caused a problem that a Lorentz spectrum could not be monitored in measuring the SMF part. However, such a depression can be eliminated by controlling the offset and amplitude of intensity modulation while maintaining the overall shape of the Brillouin gain spectrum BGS. The result of monitoring the modulated light IM3 shows the most appropriate condition in this point, and the background noise level of the Brillouin gain spectrum BGS remained low and flat with respect to the actual signal at both SMF part and DSF part, and the signal peak was apparently distinguished from the noise level. That is, it becomes apparent that the modulated light IM3 is an example of the most effective intensity modulation from the standpoint that the peak frequency of the actual signal can be correctly determined at any part.

Figure 8A:
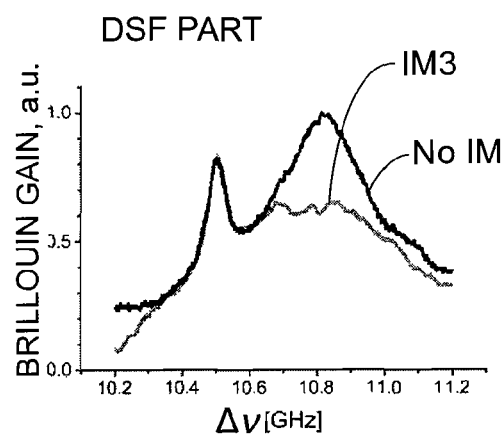
FIG. 8a is a graph showing Brillouin gain spectra measured at the DSF part and the SMF part for a case where no intensity modulation is performed (No IM) in the experimental example of the apparatus shown in FIG. 1.
Figure 8B:
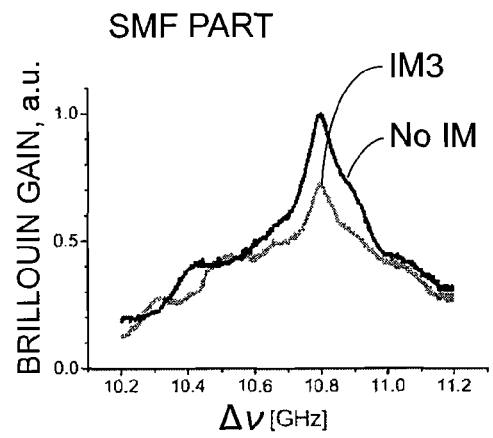
FIG. 8b is a graph showing Brillouin gain spectra measured at the DSF part and the SMF part for a case where most appropriate intensity modulation is performed (IM3) in the experimental example of the apparatus shown in FIG. 1.

FIG. 8 shows the measurement results of Brillouin gain spectra for a case where no intensity modulation was performed (No IM) and a case where most appropriate intensity modulation was performed (IM3) at the same signal amplitude. The part (a) shows the measurement result at the DSF part, and the part (b) shows the measurement result at the SMF part. Let us suppose that the SNR is the peak-to-peak ratio between the actual signal and the background noise, then, for the Brillouin gain spectrum at the DSF part, the SNR become 1.27 from 0.82, and an improvement of 45% was calculated. Considering the SNR here achieved, it is thought that the experimental apparatus achieves further extension of the measurement range $d_m$.

FIG. 9 shows the result of distribution measurement over the measurement-target optical fiber FUT for every 10 cm using the same experimental apparatus for a case where intensity modulation was performed and for a case where no intensity modulation was performed to confirm the effect of the modulated light (IM3) having undergone the most appropriate intensity modulation. Corresponding to "1", "2", and "3" shown in FIG. 5, relationships between positions of the DSF part and the Brillouin frequencies $V_B$ are shown in parts (a), (b), and (c), respectively. As is clearly shown in FIG. 9, for the modulated light (IM3) having undergone the most appropriate intensity modulation, accurate detection was possible for any position of the DSF part, and in contrast, in the case where no intensity modulation was performed (No IM), the position of the DSF part was lost. Note that the measurement error of the Brillouin frequency $V_B$ was about ±3 MHz.

As explained above, new apparatus and method improving the performance of the BOCDA method by performing intensity modulation on output light from the light source 1 has been demonstrated. According to the experimental result, by performing appropriate intensity modulation, the background noise level of a Brillouin gain spectrum can be changed and suppressed, thereby considerably increasing the measurement range. Moreover, a 30-cm spatial resolution and distribution measurement around 300 m are realized, and the improvement of the performance is confirmed for a case where accurate measurement is difficult only by normal frequency modulation. As a result, the SNR is improved more than or equal to 40%.

Next, an explanation will be given of another experimental example achieved by further optimizing a modulation waveform and the result thereof. The experimental apparatus used was the same one as that of FIG. 1, but the amplitude Δf frequency modulation was set to 32.5 GHz, and the frequency-modulation frequency of the semiconductor laser 3 was set to 91 to 191 kHz. This corresponds to the measurement range $d_m$ greater than or equal to 1010 m and the spatial resolution Δz less than or equal to 30 cm. A delay fiber of greater than or equal to 10 km was used as the optical delay device 11.

Figure 10:
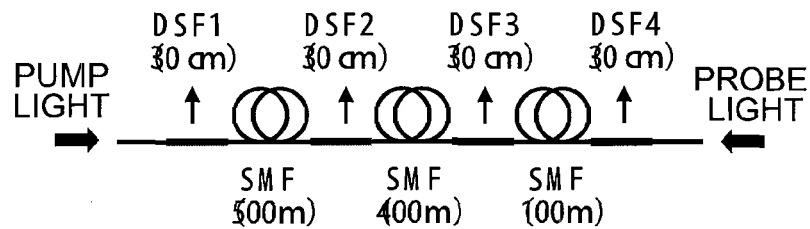
FIG. 10 is an explanatory diagram showing the structure of a measurement-target optical fiber FUT used in another experimental example of the apparatus shown in FIG. 1.

As shown in FIG. 10, the measurement-target optical fiber FUT comprised three general fibers (SMF) each having a length of 100 m, 400 m, and 500 m, and four dispersion shifted optical fibers (DSF) each having a length of 30 cm, and all fibers were connected together, and the total length thereof was about 1010 m. The average Brillouin frequency $V_B$ of the measurement-target optical fiber FUT was 10.5 GHz at the DSF part, and 10.8 GHz at the SMF part, and this is the same as one shown in FIG. 5.

Figure 11:
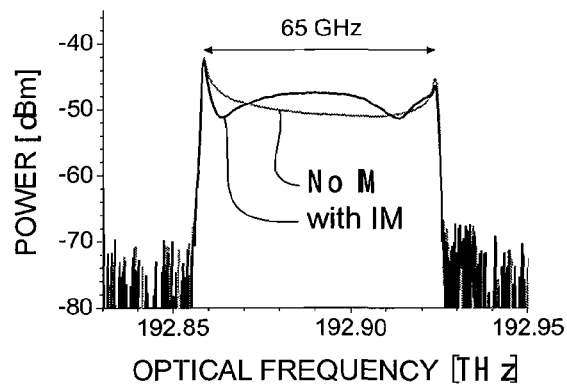
FIG. 11 is a graph showing power spectra in a case where no conventional intensity modulation is performed (No IM) and in a case where most appropriate intensity modulation is performed (with IM) in another experimental example of the apparatus shown in FIG. 1.

In this experimental example, modulated lights having different power spectra shown in FIG. 11 were generated for a case where no conventional intensity modulation was performed but sinusoidal frequency modulation was performed (No IM), and for a case where most appropriate intensity modulation was performed using the optical intensity modulator 4 (with IM), respectively. In this case, the power spectrum of the modulated light (No IM) not subjected to intensity modulation had intensities increased at both ends of the upper limit of the frequency and the vicinity of the lower limit thereof, and the power spectrum of the most appropriate modulated light (with IM) was adjusted in such a manner as to maintain a part that the intensity thereof increased at both ends of the modulated frequency, and to have the intensity increased at an approximate center of the modulated frequency width.

Figure 12A:
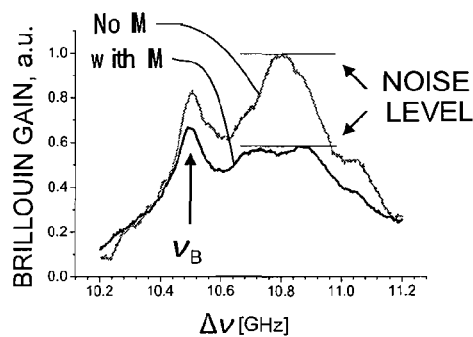
FIG. 12a is a graph of Brillouin gain spectra measured at the DSF part and the SMF part in a case where no conventional intensity modulation is performed (No IM) in another experimental example of the apparatus shown in FIG. 1.
Figure 12B:
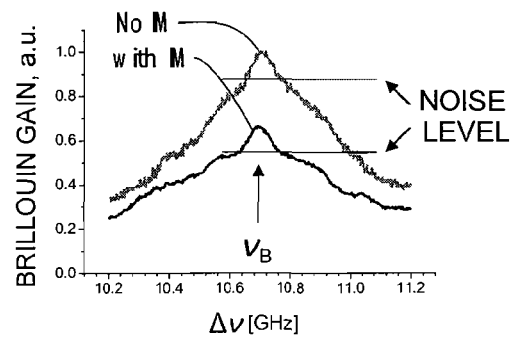
FIG. 12b is a graph of Brillouin gain spectra measured at the DSF part and the SMF part in a case where most appropriate intensity modulation is performed (with IM) in another experimental example of the apparatus shown in FIG. 1.

FIG. 12 shows a comparison result of Brillouin spectra between the conventional case (No IM) and the case where most appropriate intensity modulation was performed (with IM). FIG. 12(*a*) and FIG. 12(*b*) show measurement results of a Brillouin gain at the DSF part and the SMF part, respectively, when the frequency difference ΔV is swept to 11.2 GHz from 10.2 GHz. The peak of the Brillouin frequency $V_B$ indicated by an arrow is a local Brillouin signal (aforementioned actual signal) from a correlation peak, and the amplitude thereof is normalized with the same scale. The other parts are accumulated background noise from all of the other parts of the measurement-target optical fiber FUT. In a case where the most appropriate intensity modulation was performed (with IM), it is apparent that the amplitude of the background noise dramatically decreased in comparison with a case where no conventional intensity modulation was performed (No IM) at both DSF part and SMF part of the measurement-target optical fiber FUT. In particular, in the measurement result for the DSF part shown in FIG. 12(*a*), in a case where the most appropriate intensity modulation was performed (with IM), the noise level was suppressed as to be lower than the Brillouin signal, so that it becomes possible to detect a local Brillouin frequency accurately through simple peak searching.

FIG. 13 shows a result of distribution measurement in tens of centimeters over the measurement-target optical fiber FUT in a case where the most appropriate intensity modulation was performed (with IM). Corresponding to "1", "2", "3", and "4" shown in FIG. 10, relationships between positions of the DSF part and the Brillouin frequencies are shown in (a), (b), (c), and (d), respectively. As is clear from the result shown in FIG. 13, the 30-cm DSF part was correctly detected across the measurement-target optical fiber FUT having a length of 1 km. Note that the measurement error of the Brillouin frequency $V_B$ was about ±3 MHz.

As explained above, according to this experimental example, by performing appropriate intensity modulation on output light from the light source 4 by the optical intensity modulator 4 in such a way that light having a spectrum shape shown in FIG. 11 is output, it becomes possible to further improve the performance of the BOCDA method. According to the experimental result, by performing appropriate intensity modulation, the background noise level of a Brillouin spectrum can be further suppressed, and a distribution measurement across a range of 1 km becomes possible at a spatial resolution of 30 cm.

As explained above, the optical-fiber-characteristic measuring apparatus of the first embodiment has the light source 1 as a light source unit which outputs light having undergone frequency modulation, the probe light generating means 31 which causes some of the output light from the light source 1 to be subjected to frequency shift by the SSB modulator 8 serving as frequency shifting means, and which cause that light to be input as the probe light into one end of the measurement-target optical fiber FUT, the pump light generating means 32 which causes the remainder of the output light from the light source 1 to be input as the pump light into the other end of the measurement-target optical fiber FUT, the measuring means 33 which detect the Brillouin gain of the probe light output from the measurement-target optical fiber FUT while sweeping the frequency difference ΔV between the pump light and the probe light, and which measures the characteristic of the measurement-target optical fiber FUT, and the optical intensity modulator 4 serving as spectrum distribution adjusting means for arbitrarily adjusting the spectrum distribution relative to the frequency of the light from the light source 1 and as intensity modulating means for modulating the intensity of the output light in synchronization with the frequency modulation performed on the light source 1.

Corresponding to the foregoing apparatus, the optical-fiber-characteristic measuring method of the first embodiment performs frequency shifting on frequency-modulated light from the light source 1 serving as the light source unit by, for example, the SSB modulator 8, inputs that light as the probe light into one end of the measurement-target optical fiber FUT, and inputs light having undergone frequency modulation from the same or different light source 1 as the pump light into the other end of the measurement-target optical fiber FUT, detects the Brillouin gain of the probe light output from the measurement-target optical fiber FUT while sweeping the frequency difference ΔV between the pump light and the probe light, and measures the characteristic of the measurement-target optical fiber FUT, and is characterized by performing intensity modulation on the output light in synchronization with the frequency modulation of the light source unit to arbitrarily adjust the spectrum distribution relative to the frequency of light from the light source 1.

Note that the light source unit includes not only the single light source 1 which generates the probe light and the pump light as shown in FIG. 1, but also separate light sources for respective probe light and pump light.

According to the foregoing apparatus and method, the intensity modulating means performs intensity modulation in synchronization with the frequency modulation performed on the light from the light source 1, so that it is possible to increase or weaken the intensity of the light at a specific frequency, thereby appropriately adjusting the spectrum distribution of the output light. Accordingly, the noise spectrum shape generated at positions other than a correlation peak position and expanding over the frequency axis can be adjusted, and the peak frequency of the Lorentz spectrum generated at the correlation peak position can be measured precisely, and the measurement range $d_m$ can be extended. That is, there is provided new optical-fiber-characteristic measuring apparatus and optical-fiber-characteristic measuring method which effectively suppress the noise level of integrated unnecessary components from non-correlation positions, thereby improving the measurement precision and extending the measurement range $d_m$.

Moreover, the optical-fiber-characteristic measuring apparatus of the embodiment has the optical intensity modulator 4 serving as the intensity modulating means. Corresponding to such a structure, the optical-fiber-characteristic measuring method of the embodiment performs intensity modulation on the output light through the optical intensity modulator 4.

In this case, it becomes possible to perform appropriate intensity modulation on the output light from the light source 1 on the basis of a synchronization signal received from the light source 1.

Next, explanations will be given of some of preferable embodiments for apparatuses and methods in lieu of the first embodiment. Note that the same structural parts as those of the first embodiment will be denoted by the same reference numerals, and the explanations thereof will be omitted as much as possible to avoid redundancy.

Figure 2:
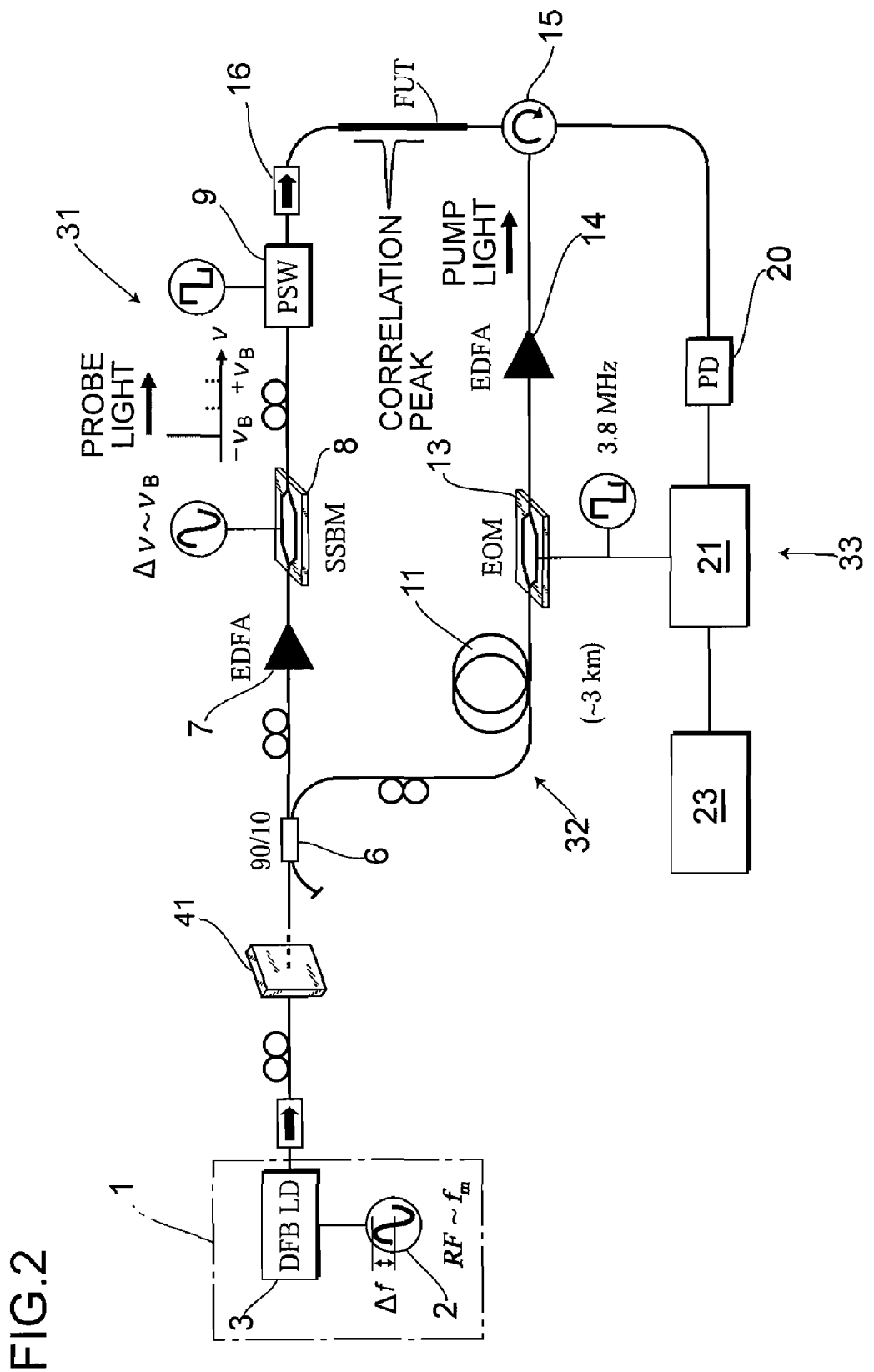
FIG. 2 is a block diagram showing the structure of an optical-fiber-characteristic measuring apparatus according to the second embodiment of the invention.

FIG. 2 shows an apparatus according to a second embodiment, and an optical filter 41 having an appropriate transmission spectrum characteristic is disposed in the optical path of the output light from the light source 1 instead of the optical intensity modulator 4. In this case, the optical filter 41 substantially performs intensity modulation as the intensity modulating means in synchronization with the frequency modulation performed on the output light from the light source 1, thereby appropriately adjusting the spectrum distribution of the output light. In a case where the optical filter 41 is used, the output light can be intensively adjusted in accordance with the frequency thereof because of the filtering characteristic of the optical filter 41, the synchronization signal from the signal generator 2 becomes unnecessary, and the reduction of the noise S2 and the extension of the measurement range $d_m$ remarkably easily achieved.

Figure 3:
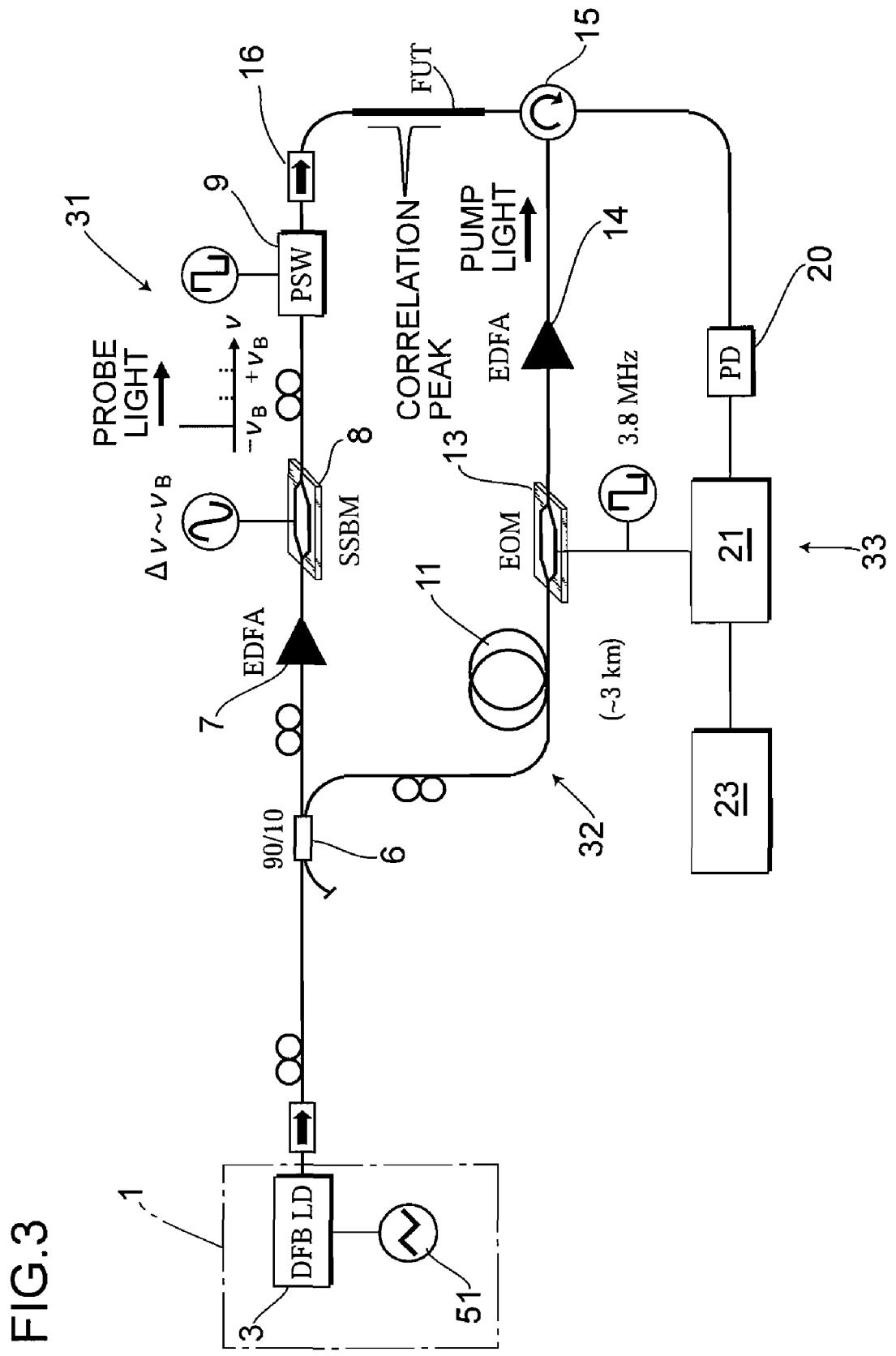
FIG. 3 is a block diagram showing the structure of an optical-fiber-characteristic measuring apparatus according to the third embodiment of the invention.

Further, as another structure of the intensity modulating means, a direct-modulation-scheme type signal generator 51 which performs frequency modulation on the output light from the light source 1 with repeated waveforms other than a sinusoidal wave instead of the external-modulation-scheme type optical intensity modulator 4. FIG. 3 shows such an example as a third embodiment, and the signal generator 51 has a function of performing frequency modulation on the output light from the semiconductor laser 3 with a triangular repeated waveform for example.

Figure 14C:
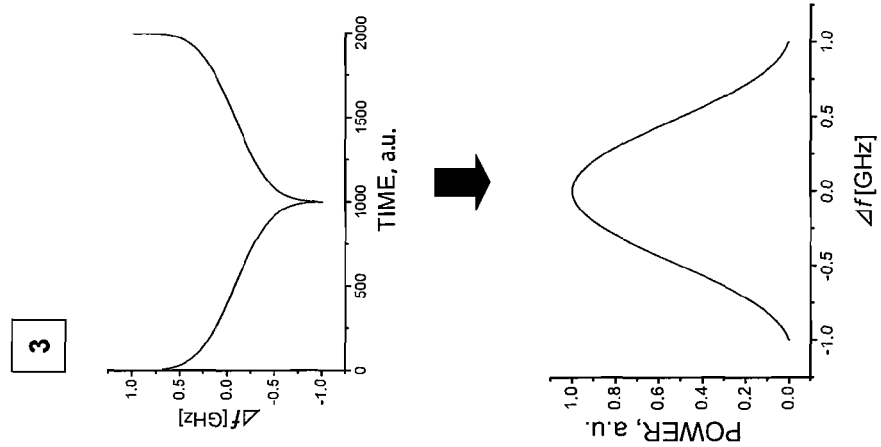
FIGS. 14a-14c are graphs showing frequency modulation waveforms and spectrum shapes in a case where frequency modulation is performed on output light with a sinusoidal repeated waveform, and in a case where frequency modulation is performed on the output light with repeated waveforms other than the sinusoidal wave.
Figure 14B:
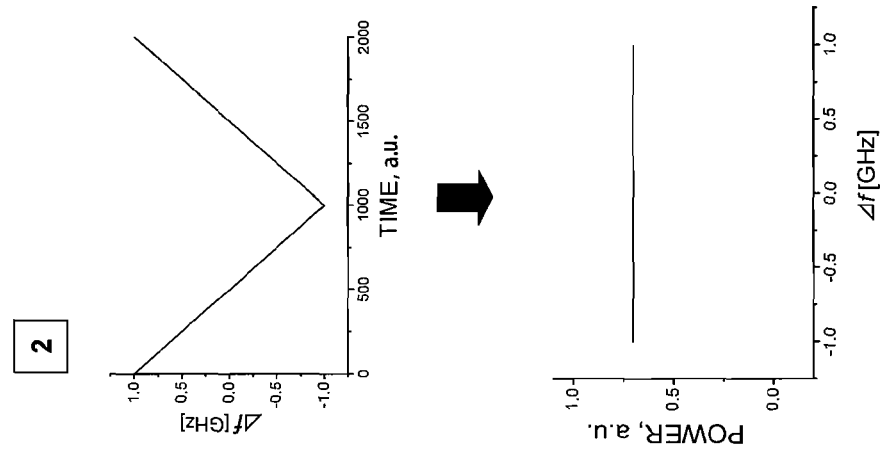
Figure 14A:
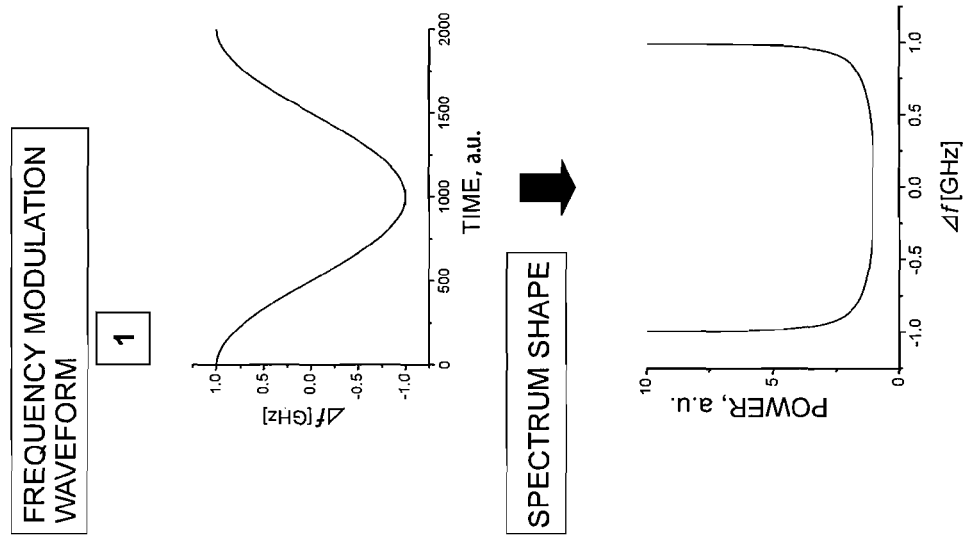

FIG. 14 shows frequency modulation waveforms for a case where the output light is subjected to frequency modulation with a conventional sinusoidal repeated waveform, and for a case where the output light is subjected to frequency modulation with a repeated waveform other than the sinusoidal waveform, and time-average spectrum shapes calculated from those frequency modulation waveforms. In the figure, the upper part of (a) shows a conventional frequency modulation waveform (it is shown as a cosine wave for convenience, but is substantially equivalent) in a case where the frequency of the output light from the light source 1 is changed like a sinusoidal waveform, and in this case, it remains at the maximum displacement part of the varying frequency for a relatively long time, so that as is shown by the spectrum shape waveform shown in the lower part, the spectrum intensity (power) largely deflects at both ends in the vicinity of the upper limit of the frequency and the lower limit thereof. On the other hand, in a case where the frequency of the output light from the light source 1 is changed with a triangular waveform shown in the upper part of FIG. 14(*b*), it remains at all frequencies for the same time, so that as shown in the lower part of (b), the spectrum intensity becomes uniform. Further, in a case where the frequency of the output light from the light source 1 is changed with a repeated waveform shown in the upper part of FIG. 14(*c*), the spectrum intensity becomes like a Gaussian distribution as shown in the lower part of (c).

Figure 15A:
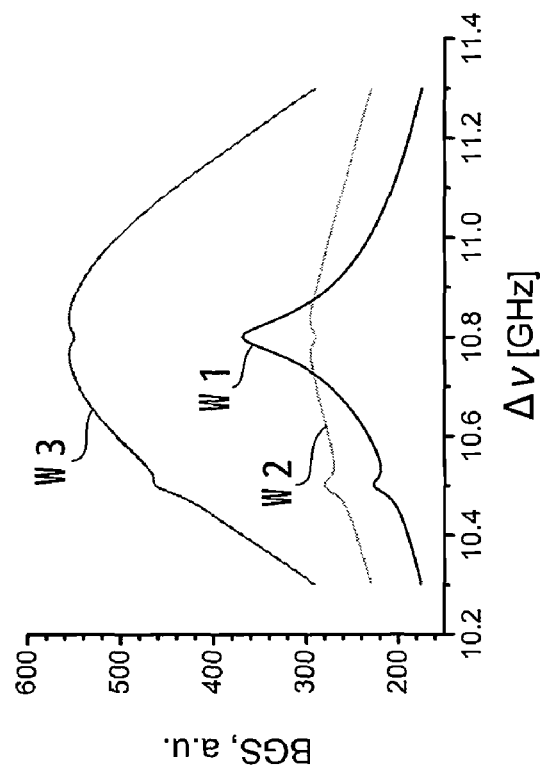
FIG. 15a is a graph showing normalized Brillouin gain spectrum shapes and FIG. 15b is a graph showing absolute value Brillouin gain spectrum shapes, in a case where frequency modulation is performed on the output light with a sinusoidal repeated waveform and in a case where frequency modulation is performed on the output light with a repeated waveform other than the sinusoidal wave.
Figure 15B:
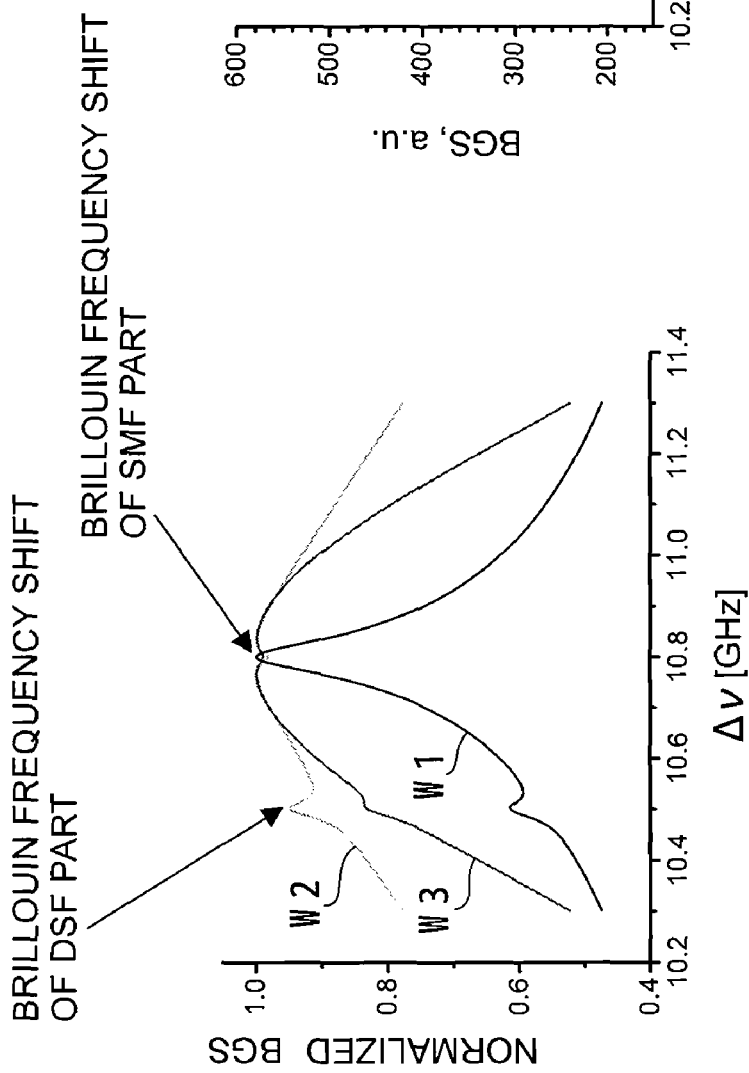

FIG. 15 shows a simulation result how a Brillouin gain spectrum becomes in a case where the DSF part of the measurement-target optical fiber FUT is measured using the output lights having the respective frequency modulation waveforms shown in FIG. 14. In the figure, W1 denotes the condition of FIG. 14(*a*), W2 denotes the condition of FIG. 14(*b*), and W3 denotes the condition of FIG. 14(*c*). Let us suppose that the measurement-target optical fiber FUT has the DSF part which is 1/1000 of the entire length, and the other part is the SMF part. FIG. 15(*a*) shows a normalized Brillouin gain spectrum shape, FIG. 15(*b*) shows an absolute-value Brillouin gain spectrum shape, and in particular, in a case where the output light of the light source 1 is subjected to frequency modulation with a triangular repeated waveform, it becomes apparent that determination of the peak frequency at the DSF part is facilitated. By merely selecting the frequency modulation waveform, it becomes possible to perform intensity modulation on the output light from the light source 1 equivalently, and the reduction of the noise and the extension of the measurement range $d_m$ become possible to some level.

In the third embodiment, the intensity modulating means comprises the signal generator 51 which performs frequency modulation on the output light from the light source 1 with a repeated waveform other than a sinusoidal waveform. The frequency modulation performed on the output light is carried out at the signal generator 51 which performs frequency modulation on the output light from the light source 1 with a repeated waveform other than a sinusoidal waveform. The spectrum distribution of the output light can be appropriately adjusted like the case where intensity modulation is performed on the output light by changing the frequency modulation waveform of the output light to one other than a sinusoidal waveform using the signal generator 51, thereby ensuring the reduction of the noise and the extension of the measurement range.

Figure 4:
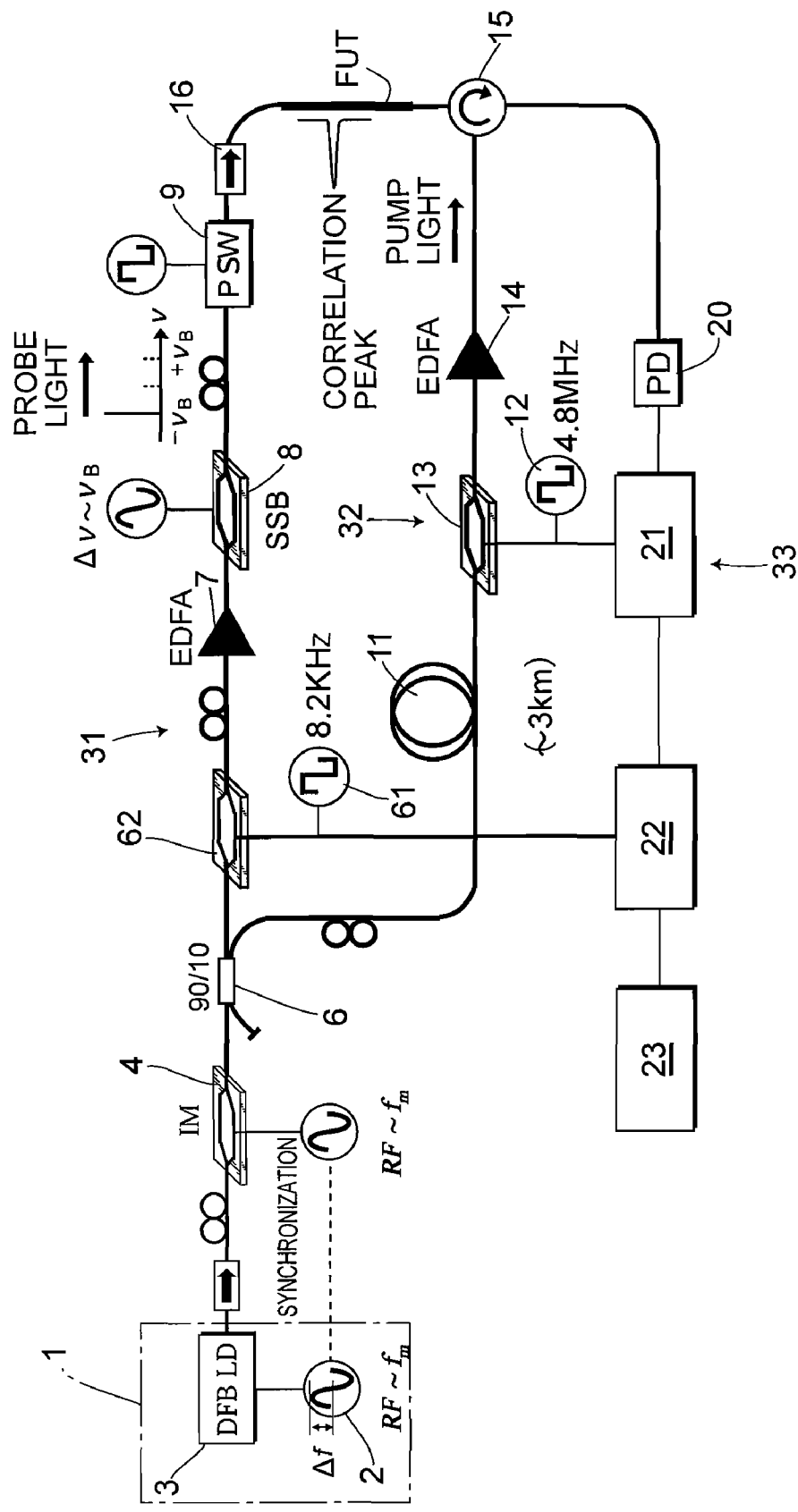
FIG. 4 is a block diagram showing the structure of an optical-fiber-characteristic measuring apparatus according to the fourth embodiment of the invention.

FIG. 4 shows an apparatus according to the fourth embodiment of the invention. In this embodiment, the "double lock-in method" proposed in Japanese Patent Application No. 2005-348482 by the inventors is applied to the apparatus of the first embodiment. Note that the optical intensity modulator 4 is used as the intensity modulating means in FIG. 4, but the optical filter 41 of the second embodiment or the signal generator 51 of the third embodiment can be used. In the embodiment, a second optical intensity modulator 62 having a reference signal generator 61 performs intensity modulation on the probe light at a different frequency from the pump light, and a detection output from the light detector 20 is subjected to synchronous detection at the modulation frequency of the pump light, and is also subjected to synchronous detection at the modulation frequency of the probe light by passing through a first lock-in amplifier 21 and a second lock-in amplifier 22 both connected in series, and only the increment of the probe light inherent to a stimulated Brillouin phenomenon is captured as final data by the data processing device 23 at a predetermined sampling rate.

The probe light and the pump light propagating in the measurement-target optical fiber FUT are chopped by the second optical intensity modulator 62 and the first optical intensity modulator 13, respectively, at different frequencies. As such lights are propagated oppositely in the measurement-target optical fiber FUT, the increment of the probe light inherent to stimulated Brillouin scattering is superimposed on the chopped probe light, and chopped by the intensity modulation frequency of the pump light, and then output from the measurement-target optical fiber FUT. The output light is detected by the light detector 20, and is subjected to synchronous detection by the first lock-in amplifier 21 at the intensity modulation frequency of the pump light, and then only some of the pump light having the same intensity modulation frequency component and the increment of the probe light are taken out and amplified, and the other frequency components are eliminated. Some of the pump light detected by the first lock-in amplifier 21 are not affected by the intensity modulation frequency of the probe light, but the increment of the probe light which is inherent to stimulated Brillouin scattering and is detected by the first lock-in amplifier 21 is synchronized with the intensity modulation frequency of the original probe light. Accordingly, as the second lock-in amplifier 22 performs synchronous detection at the intensity modulation frequency of the probe light, only the increment of the probe light is taken out and amplified, and other noise components including some of the pump light are completely eliminated at this stage.

That is, according to the apparatus shown in FIG. 4, the original probe light is subjected to intensity modulation at a different frequency from the pump light, so that only the increment of the probe light necessary for a strain measurement is synchronized with the intensity modulation frequency of the probe light after the first lock-in amplifier 21 performs synchronous detection on some of the pump light and the increment of the probe light. By utilizing this fact, it is possible for the second lock-in amplifier 22 to completely separate the increment of the probe light from other components without disposing an optical wavelength filter ahead of the light detector 20. Furthermore, in a case where the amplitude $\Delta f$ of the frequency modulation of the light source 1 is expanded to some level in order to extend the measurement range $d_m$ while maintaining the spatial resolution $\Delta z$ of the apparatus high, because the increment of the probe light is not detected using the frequency difference $\Delta V$ between the pump light and the probe light, only the necessary increment of the probe light can be detected correctly without any affection of the amplitude $\Delta f$.

The measurement range $d_m$ can be extended in a synergistic manner by combining the intensity modulation explained in the first to third embodiments with the "double lock-in method" explained in the fourth embodiment. Needless to say, if the concept of the intensity modulation explained in the first to third embodiments is combined with various BOCDA methods other than the "double lock-in method", the measurement precision is improved, and the measurement range $d_m$ is extended.

Next, respective simulation results of a conventional example and the BOCDA system of the embodiment will be explained with reference to FIGS. 16 to 21.

FIG. 16 shows simulation waveforms at individual parts of the BOCDA system in a case where only frequency modulation is performed on the output light from the light source 1. The output light is subjected to sinusoidal frequency modulation with the waveform shown in the upper part of FIG. 16(a), to localize a position where stimulated Brillouin scattering occurs along the measurement-target optical fiber FUT. On the other hand, the lower part of FIG. 16(a) is the intensity modulation waveform of the output light, and shows that no intensity modulation is performed. At this time, the time-average spectrum of the output light from the light source 1 becomes like as shown in FIG. 16(b), and this is equal to the waveform shown in the lower part of FIG. 14(a).

Figure 16A:
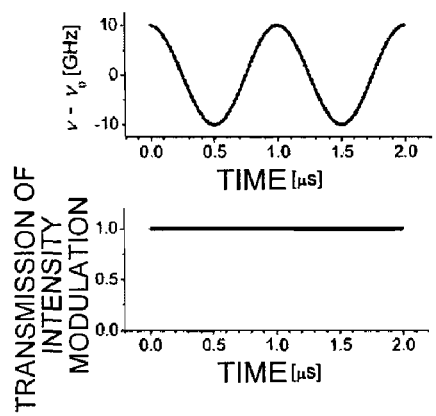
FIG. 16a shows simulation results of a BOCDA system in a case where only frequency modulation is performed, and is a graph showing the frequency modulation waveform and intensity modulation waveform of the output light of a light source.
Figure 16B:
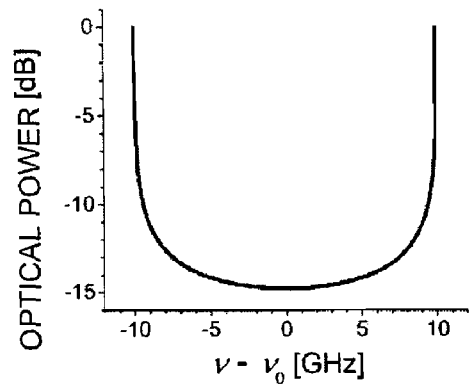
FIG. 16b shows simulation results of a BOCDA system in a case where only frequency modulation is performed, and is a graph showing the time-average spectrum shape of the output light from the light source.
Figure 16C:
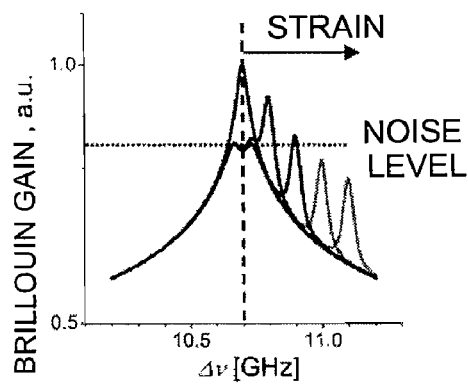
FIG. 16c shows simulation results of a BOCDA system in a case where only frequency modulation is performed, and is a graph showing an output spectrum shape.

In this case, at the position where stimulated Brillouin scattering locally occurs (measurement point), a Lorentz spectrum is generated. On the other hand, the spectrum is widespread over the frequency axis at positions other than the localized position, and the integration thereof along the measurement-target optical fiber FUT appears in the output spectrum of the measured system. The spectrum shape thereof is a mountain-like shape having a slight depression at the center of the frequency, and slopes decreasing in a curved manner as the frequency increases or decreased from the depression. FIG. 16(c) shows the output spectrum of the BOCDA system acquired when there is one strain along the measurement-target optical fiber FUT. As the size of the strain changes, the Lorentz spectrum changes as if it slides down the mountain-like background spectrum.

Conventionally, when the measurement range $d_m$ becomes long with respect to the spatial resolution $\Delta z$, the background spectrum becomes relatively large, and the measurement precision decreases. The further important point is that, conventionally, the vertex of the mountain-like background spectrum becomes higher than the front end of the Lorentz spectrum as the amount of strain becomes large, so that it becomes difficult to detect the strain.

Figure 16D:
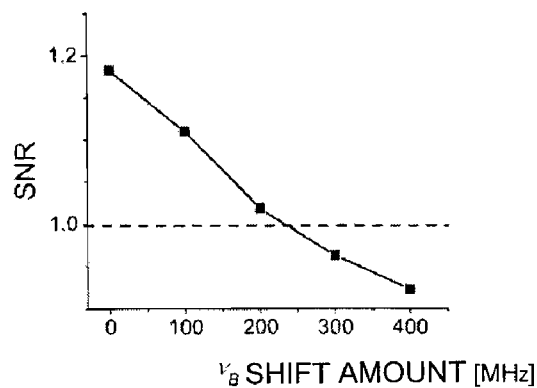
FIG. 16d shows simulation results of a BOCDA system in a case where only frequency modulation is performed, and is a graph showing a relationship between a Brillouin-frequency shift amount and an SNR.

FIG. 16(d) plots the ratio between a spectrum of a measurement point and the height of a mountain-like spectrum as the function of the strain amount. When the value of this SNR becomes less than or equal to 1, it becomes difficult to measure a strain. According to this simulation, as shown in FIG. 16(d), 230 MHz is the limit of a strain measurement as the shift amount of the Brillouin frequency $V_B$, and this corresponds to a strain amount of 0.46% (4600µε).

Subsequently, an explanation will be given of a case where frequency modulation and intensity modulation are both performed on the output light. Like the foregoing embodiments, when the semiconductor laser 3 is used as the light source 1, and frequency modulation is performed using the direct frequency modulation characteristic of the laser, the intensity modulation changes in accordance with the frequency modulation due to a change in the injected current to the semiconductor laser 3. FIG. 17 simulates the affection thereof.

Figure 17A:
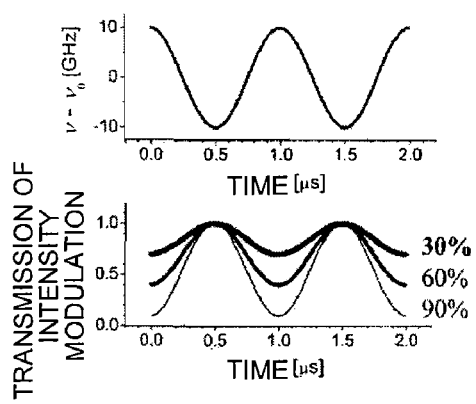
FIG. 17a shows simulation results of the BOCDA system in a case where intensity modulation inherent to frequency modulation is performed, and is a graph showing the frequency modulation waveform and intensity modulation waveform of the output light from the light source.
Figure 17B:
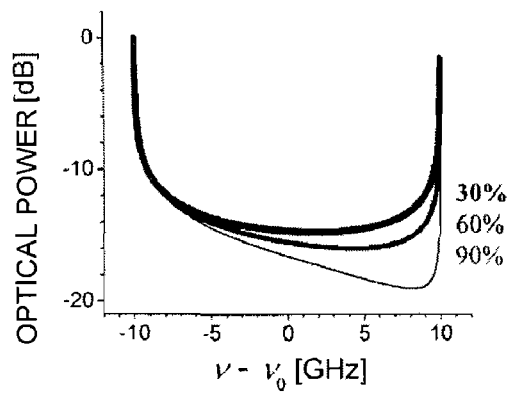
FIG. 17b shows simulation results of the BOCDA system in a case where intensity modulation inherent to frequency modulation is performed, and is a graph showing the time-average spectrum shape of the output light from the light source.
Figure 17C:
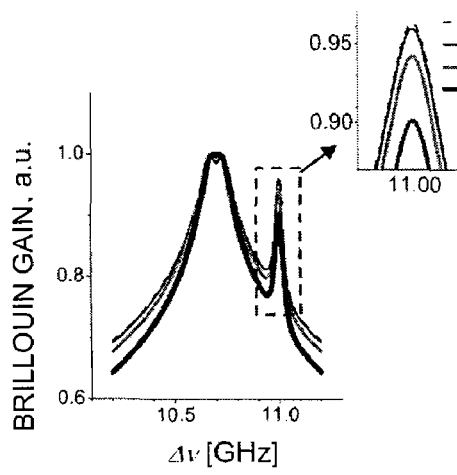
FIG. 17c shows simulation results of the BOCDA system in a case where intensity modulation inherent to frequency modulation is performed, and is a graph showing an output spectrum shape.

It is thought that the frequency and the intensity change in proportion to the injected current to the semiconductor laser 3. The way how the frequency and the intensity change is represented by the frequency modulation of the output light in the upper part of FIG. 17(a), and the intensity modulation waveform of the output light in the lower part of FIG. 17(a). As the intensity modulation to the output light becomes large, the time-average spectrum shown in FIG. 17(b) becomes asymmetric. For example, in simulating a case where the modulation percentage indicating the level of the intensity modulation becomes gradually large to 30%, 60%, and 90%, the asymmetrical property of the time-average spectrum becomes large. As the asymmetrical property becomes large, as shown in FIG. 17(c), the slope of the mountain-like background spectrum becomes steep. That is, the detection limit of the strain amount becomes small. Note that "No IM" in FIG. 17(c) represents a spectrum shape when no conventional intensity modulation is performed.

Figure 17D:
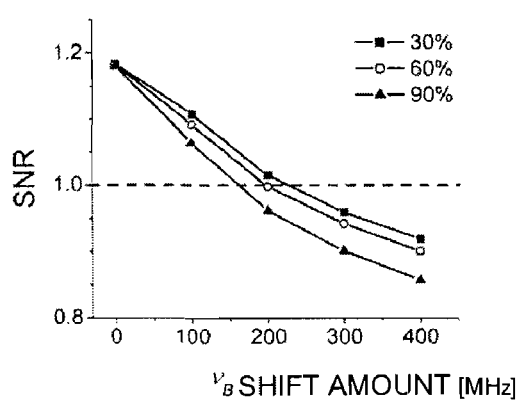
FIG. 17d shows simulation results of the BOCDA system in a case where intensity modulation inherent to frequency modulation is performed, and is a graph showing a relationship between a Brillouin-frequency shift amount and an SNR.

FIG. 17(d) plots a ratio between the spectrum of a measurement point and the height of the mountain-like spectrum as the function of the strain amount. The larger the asymmetric property of the time-average spectrum becomes, i.e., the larger the intensity modulation becomes, the smaller the detection limit of the strain amount becomes. As an example, for the intensity modulation having the modulation percentage of 60%, about 200 MHz is the limit of the strain measurement as the shift amount of the Brillouin frequency $V_B$.

That is, it is desirable that when the direct frequency modulation characteristic of the semiconductor laser 3 is used, the affection of the intensity modulation inherent to the foregoing characteristic should be compensated.

FIG. 18 shows simulation results when intensity modulation is performed in synchronization with frequency modulation changing sinusoidally to compensate the affection of the intensity modulation. In a case where frequency modulation with a sinusoidal wave is performed on the output light from the light source 1, the intensity becomes large at both sides of the time-average spectrum. To compensate this, let us suppose that any one of the first to fourth embodiments is selected and intensity modulation in synchronization with frequency modulation is performed.

Figure 18A:
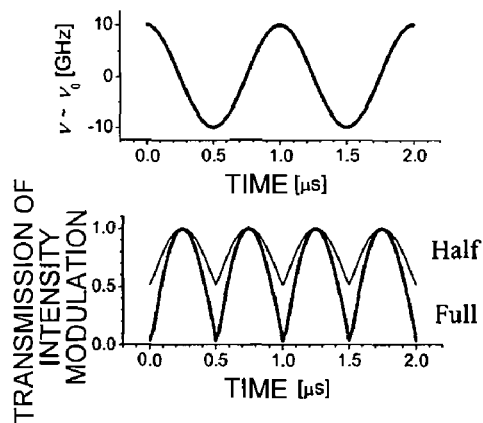
FIG. 18a shows simulation results of the BOCDA system in a case where intensity modulation is performed in synchronization with frequency modulation, and is a graph showing the frequency modulation waveform and intensity modulation waveform of the output light from the light source.
Figure 18B:
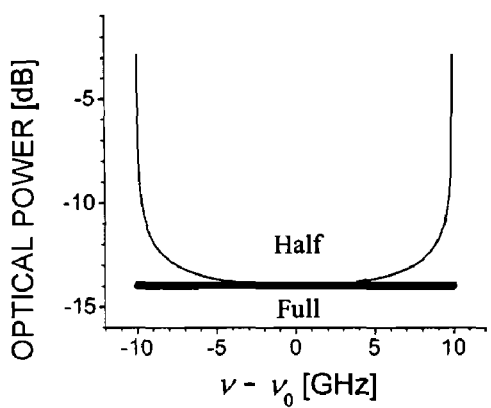
FIG. 18b shows simulation results of the BOCDA system in a case where intensity modulation is performed in synchronization with frequency modulation, and is a graph showing the time-average spectrum shape of the output light from the light source.

The upper part of FIG. 18(a) shows the frequency modulation waveform of the output light changing sinusoidally, and intensity modulation is performed in synchronization with the varying upper limit and lower limit of the frequency in such a way that the intensity of the output light becomes minimum. The lower part of FIG. 18(a) shows an example of such intensity modulation, and "Full" represents intensity modulation that the time-average spectrum becomes flat across the entire frequencies. The time-average spectrum in this case is represented by "Full" in FIG. 18(b). "Half" in the lower part of FIG. 18(a) represents a case where the minimum value of the intensity modulation is set to half, i.e., 0.5, and the values of the time-average spectrum at both sides are reduced, but are not flat. FIG. 18(b) also shows a time-average spectrum at this time (see, waveform of "Half" in figure).

Figure 18C:
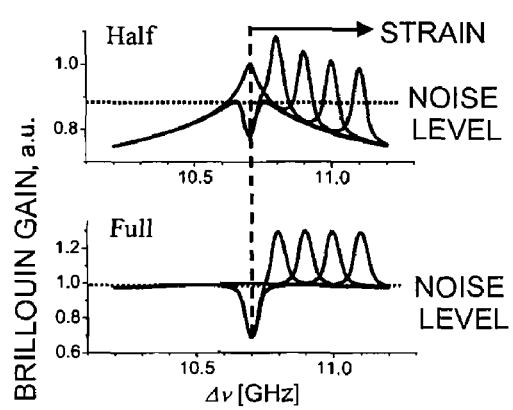
FIG. 18c shows simulation results of the BOCDA system in a case where intensity modulation is performed in synchronization with frequency modulation, and is a graph showing an output spectrum shape.

The output spectrum of the BOCDA system at this time becomes like as shown in FIG. 18(c). In case of "Half" shown in the upper part of FIG. 18(c), the height of the mountain-like background spectrum becomes low, and in case of "Full" shown in the lower part of FIG. 18(c), the background spectrum becomes flat. However, at the center of the background spectrum, there is a depression for both cases of "Half" and "Full". As a result, regarding "Half", when there is no depression (when the Brillouin frequency shift amount becomes uniform across the entire optical fiber length), the Lorentz spectrum at a measurement point falls into the depression and becomes low. Further, regarding "Full", the Lorentz spectrum completely falls into the depression, and it becomes difficult to measure a strain.

Figure 18D:
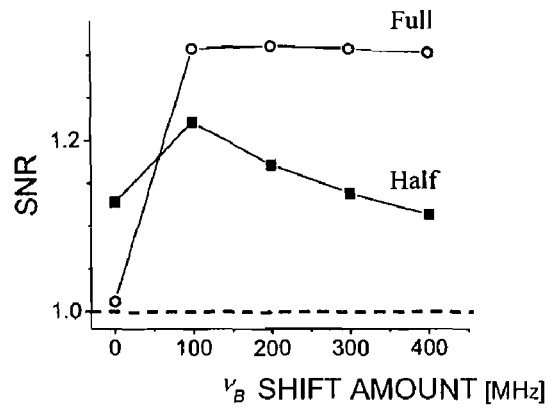
FIG. 18d shows simulation results of the BOCDA system in a case where intensity modulation is performed in synchronization with frequency modulation, and is a graph h showM a relationship between a Brillouin-frequency shift amount and an SNR.

FIG. 18(d) plots a ratio between the spectrum of a measurement point and the height of the mountain-like spectrum as the function of the strain amount. In a case where a strain is small at a measurement point in comparison with surrounding points (or in a case where no strain is present), it becomes apparent that measurement is difficult. On the other hand, however, when the strain becomes large, it is not hidden by the background spectrum, and from the standpoint of this, the limit of strain measurement is improved in comparison with the measuring system shown in FIG. 16 or FIG. 17.

In FIG. 18, as the frequency of the output light becomes close to the center of variation, the intensity of the output light is made close to the maximum value, and intensity modulation of "Half" or "Full" is performed in such a way that the minimum value of the output light becomes, for example, less than or equal to 0.5 as the frequency of the output light becomes close to the upper limit and the lower limit. This results in an improvement of the intensive deflection of the intensity of the output light in the vicinity of the upper end and the lower end of the frequency of the output light as the frequency of the output light from the light source 1 varies. Accordingly, even if the strain of the measurement-target optical fiber FUT becomes large, the peak of the Lorentz spectrum at a measurement point can be maintained higher than the peak of the mountain-like background spectrum, and even if a large strain is applied, the value thereof can be correctly measured. However, measurement at a position where the strain amount is small (or where no strain is present) becomes difficult or impossible.

Effective means for solving this problem is to leave some more intensity at both sides of the time-average spectrum, which will be demonstrated in simulation.

The lower left part of FIG. 19 shows a waveform representing a relationship between intensity modulation to do so and a time. The waveform enclosed by the rectangular at the right part of the figure shows intensity modulation corresponding to both side portions of the output light spectrum. Intensity modulating means at this case has a function of performing original intensity modulation of "Half" and "Full", which causes the intensity of the output light to be close to the maximum value as the frequency of the output light changing sinusoidally becomes close to the center of variation, and which causes the intensity of the output light to be close to the minimum value less than or equal to 0.5 with respect to the maximum value as the frequency of the output light becomes close to the upper limit and the lower limit, and a function of performing optimization to momentarily cause the intensity of the output light to be larger than the minimum value at timings when the frequency of the output light reaches the upper limit and the lower limit. Such intensity modulating means can be combined with any one of the first to fourth embodiments.

FIG. 20 shows the simulation result of the output Brillouin spectrum of the BOCDA system which employs the optimized intensity modulation shown in FIG. 19. FIG. 20(a) shows output spectra of both original "Half" intensity modulation and optimized "Half" intensity modulation shown in FIG. 19 when a position where no strain is present is set as a measurement point. According to the optimized intensity modulation, in both cases of "Full" and "Half", the Lorentz spectrum corresponding to the measurement point can be clearly confirmed. On the other hand, FIG. 20(b) shows a spectrum when a position where a strain is applied is set as a measurement point, and regarding the optimized intensity modulation of "Full" or "Half", it becomes apparent that even if the strain becomes large, the Lorentz spectrum is not be hidden by the mountain-like spectrum. That is, in case of the optimized intensity modulation, when there is no strain amount of the measurement-target fiber or when the strain amount is little, the peak of the Lorentz spectrum can be made higher than the peak of the background spectrum, and regardless of the amount of strain of the measurement-target optical fiber FUT, it becomes possible to accurately measure a strain.

Figure 21A:
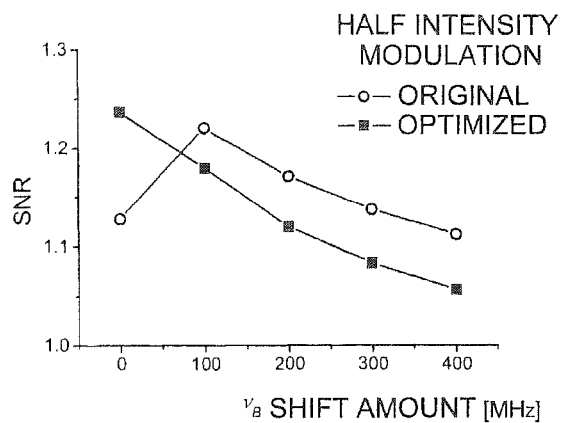
FIGS. 21a-21b are graphs showing a relationship between a Brillouin-frequency shift amount and an SNR for original intensity modulation shown in FIG. 18 and for optimized intensity modulation shown in FIG. 19.

Further, FIG. 21 shows a simulation result of plotting a ratio between the spectrum of a measurement point and the height of the mountain-like spectrum when the optimized intensity modulation shown in FIG. 19 is adopted. FIG. 21(a) shows the original "Half" intensity modulation and the optimized "Half" intensity modulation shown in FIG. 19, respectively, and it becomes apparent that the SNR of the optimized "Half" intensity modulation is improved at the shift amount of the Brillouin frequency $V_B$ corresponding to a position where the strain amount is little (or no strain is present). Moreover, the SNR of the optimized "Half" intensity modulation is maintained to greater than or equal to 1 at the shift amount of the Brillouin frequency corresponding to other positions where the strain amount is large, and accurate measurement becomes possible.

Figure 21B:
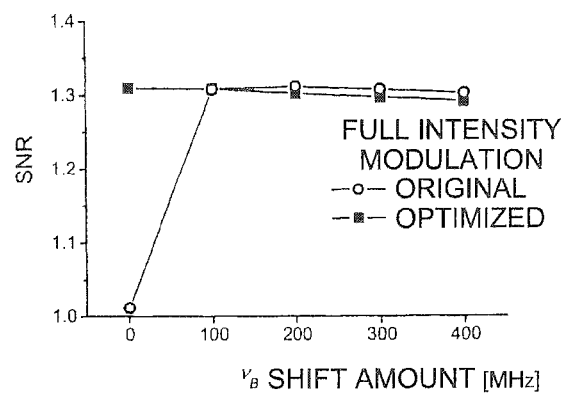
Figure 22:
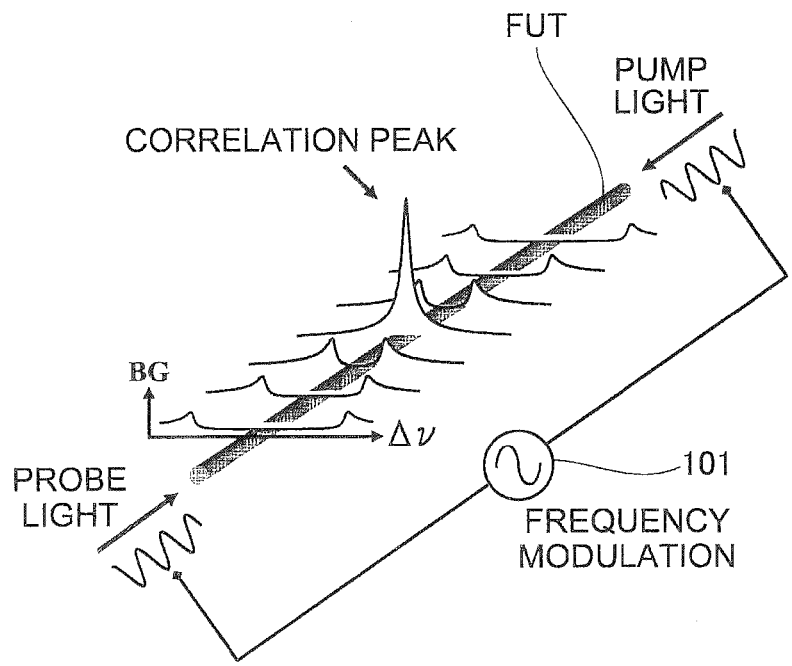
FIG. 22 is a schematic explanatory diagram exemplifying a correlation peak in a measurement-target optical fiber in a conventional example.

Likewise, FIG. 21(b) shows the original "Full" intensity modulation and the optimized "Full" intensity modulation shown in FIG. 19, respectively, and for the optimized "Full"

intensity modulation, regardless of the shift amount of the Brillouin frequency $V_B$, the sufficiently large SNR greater than or equal to 1 is maintained, and from a small strain to a large strain, the position thereof can be accurately measured. Therefore, it is apparent that a waveform which is the "Half" or "Full" intensity modulation waveform having undergone the adjustment shown in FIG. 19 is a superior intensity modulation waveform realistically.

The present invention is not limited to the foregoing embodiments, and can be changed and modified in various forms without departing from the scope of the invention. For example, frequency modulation explained in the embodiments includes a technology of phase modulation. Moreover, light from means other than the semiconductor laser can be used as long as such means can output light having undergone frequency modulation as a light source. Further, because the semiconductor laser (laser diode) 3 included in the light source 1 has limited speed and amplitude for frequency modulation, if a light source 1 having a better modulation characteristic is used, a further improvement can be achieved.

The BOCDA method of the invention improves the limit of the spatial resolution by 100 times better than the conventional one, and improves the measurement speed by 10000 times, and attracts the attention worldwide, and is the only technology which accomplishes a high spatial resolution, a fast measurement speed, and a random-access function to a measurement position in the world. Accordingly, the technology attracts attention as a nerve network to verify how much materials and structures are deteriorated, and is available in various fields, such as civil engineering, construction, aviation, space, nuclear energy, energy, traffic, and transportation. It is expected that the invention improves the performance further, and accelerates the practical application.

The invention claimed is:

1. An optical-fiber-characteristic measuring apparatus comprising:
    a light source unit which outputs light having undergone frequency modulation;
    probe light generator performing frequency shift on the output light from the light source unit and inputting that light as probe light into one end of a measurement-target optical fiber;
    pump light generator inputting the output light from the light source unit as pump light into the other end of the measurement-target optical fiber;
    measuring device detecting a Brillouin gain of the probe light output from the measurement-target optical fiber while sweeping a frequency difference between the pump light and the probe light, thereby measuring a characteristic of the measurement-target optical fiber, and
    wherein the optical-fiber-characteristic measuring apparatus further comprises
    intensity modulator modulating an intensity of the output light in synchronization with the frequency modulation of the light source unit.

2. The optical-fiber-characteristic measuring apparatus according to claim 1, wherein the intensity modulator sets the intensity of the output light to be close to a maximum value as a frequency of the output light becomes close to a center of variation, and sets the intensity of the output light to be close to a minimum value as the frequency of the output light becomes close to an upper limit and a lower limit.

3. The optical-fiber-characteristic measuring apparatus according to claim 2, wherein the intensity modulator sets the intensity of the output light to be a larger value than the minimum value at a timing when the frequency of the output light reaches the upper limit and the lower limit.

4. The optical-fiber-characteristic measuring apparatus according to claim 1, wherein the intensity modulator comprises an optical intensity modulator.

5. The optical-fiber-characteristic measuring apparatus according to claim 1, wherein the intensity modulator comprises an optical filter.

6. The optical-fiber-characteristic measuring apparatus according to claim 1, wherein the intensity modulator comprises a signal generator which performs frequency modulation on the output light from the light source unit with a repeated waveform other than a sinusoidal wave.

7. An optical-fiber-characteristic measuring method comprising:
    performing frequency shift on a light having undergone frequency modulation from a light source unit, and inputting that light as probe light into one end of a measurement-target optical fiber;
    inputting light having undergone frequency modulation by the light source unit as pump light into the other end of the measurement-target optical fiber;
    detecting a Brillouin gain of the probe light output from the measurement-target optical fiber while sweeping a frequency difference between the pump light and the probe light, thereby measuring a characteristic of the measurement-target optical fiber; and wherein the optical-fiber-characteristic measuring method further comprises
    performing intensity modulation on the output light in synchronization with the frequency modulation of the light source unit.

8. The optical-fiber-characteristic measuring method according to claim 7, wherein the intensity modulation performed on the output light is to set the intensity of the output light to be close to a maximum value as a frequency of the output light becomes close to a center of variation, and to set the intensity of the output light to be close to a minimum value as the frequency of the output light becomes close to an upper limit and a lower limit.

9. The optical-fiber-characteristic measuring method according to claim 8, wherein the intensity modulation performed on the output light is to set the intensity of the output light to be a larger value than the minimum value at a timing when the frequency of the output light reaches the upper limit and the lower limit.

10. The optical-fiber-characteristic measuring method according to claim 7, wherein an optical intensity modulator performs the intensity modulation on the output light.

11. The optical-fiber-characteristic measuring method according to claim 7, wherein an optical filter performs the intensity modulation on the output light.

12. The optical-fiber-characteristic measuring method according to claim 7, wherein a signal generator which performs frequency modulation on the output light from the light source unit with a repeated waveform other than a sinusoidal wave performs the intensity modulation on the output light.

* * * * *